(12) United States Patent
Green

(10) Patent No.: US 7,684,497 B2
(45) Date of Patent: Mar. 23, 2010

(54) METHOD AND APPARATUS FOR GENERATING M-ARY CPM WAVEFORMS FROM A SUPERPOSITION OF PAM WAVEFORMS

(75) Inventor: Marilynn P. Green, Pomona, NY (US)

(73) Assignee: Nokia Corporation, Espoo (FI)

( * ) Notice: Subject to any disclaimer, the term of this patent is extended or adjusted under 35 U.S.C. 154(b) by 1295 days.

(21) Appl. No.: 11/174,263

(22) Filed: Jun. 30, 2005

(65) Prior Publication Data

US 2007/0002986 A1 Jan. 4, 2007

(51) Int. Cl.
*H04B 14/04* (2006.01)
(52) U.S. Cl. .................... 375/242; 375/259; 375/268; 375/300; 375/286; 332/149; 332/106; 332/115
(58) Field of Classification Search ................. 375/219, 375/260, 242, 259, 268, 300, 286; 332/149, 332/106, 115
See application file for complete search history.

(56) References Cited

U.S. PATENT DOCUMENTS

| | | | | |
|---|---|---|---|---|
| 4,731,798 | A | * | 3/1988 | Dirr ........................... 375/260 |
| 2003/0108092 | A1 | * | 6/2003 | Gorecki et al. .............. 375/219 |

OTHER PUBLICATIONS

"A New PAM Decomposition for Continuous Phase Modulation", Marilynn P. Wylie-Green, Conference on Information Sciences and Systems CISS 2006. Mar. 22-24, 2006, Princeton, NJ USA, retrieved from the Internet: http://www.288.pari.com/ciss/ciss/numbered/298.pdf sections I, III, V.

"Optimal and Reduced Complexity Receivers for M-ary and Multi-h CPM", Perrins et al., Wireless Communications and Networking Conference, 2004. WCNC 2004 IEEE Atlanta, GA USA Mar. 21-25, 2004, Piscataway, NJ, IEEE vol. 2, p. 1165-1170, ISBN 0-7803-8344-3 Sections I-III, abstract.

"The PAM Decomposition of CPM Signals with Integer Modulation Index", Xiaojin Huang et al., Communications, IEEE Transactions on, publ.. Apr. 2003, vol. 51, iss. 4, pp. 543-546, ISSN 0090-6778, sections I-III, abstract.

"Decomposition of M-ary CPM Signals into PAM Waveforms", Mengali et al., IEEE Transactions on Sep. 1995, vol. 41, iss 5, pp. 1265-1275, ISSN 0018-9448, section III, abstract, cited in the application.

"Exact and Approximate Construction of Digital Phase Modulations by Superposition of Amplitude Modulated Pulses (AMP)", Pierre a Laurent, IEEE Transactions On Communications, vol. Com-34, No. 2, Feb. 1986, pp. 150-160.

(Continued)

*Primary Examiner*—Phuong Phu
(74) *Attorney, Agent, or Firm*—Harrington & Smith

(57) ABSTRACT

To reflect advantages of a constant phase modulation waveform, the invention provides a pulse amplitude modulated PAM waveform that is a superposition of $Q_0 \leq 2^{L-1}$ PAM component pulses in each symbol interval such that a significant portion of signal energy over each symbol interval is within the $Q_0$ PAM component pulses. The present invention distributes most signal energy in one pulse and progressively lower energies in the remaining $Q_0-1$ pulses of a symbol interval. The Laurent Decomposition is a special case of the present invention, but the present invention exhibits the energy distribution of the Laurent Decomposition in non-binary CPM waveforms and in multi-h (binary and non-binary) CPM waveforms, where h is a modulating index. All energy is distributed among only $Q=2^{L-1}$ pulses in each symbol interval, though only $Q_0<Q$ pulses may in fact be transmitted in certain embodiments. A method, transmitter, receiver, and computer program are disclosed. Embodiments may exactly duplicate a CPM waveform, or approximate a CPM waveform.

33 Claims, 15 Drawing Sheets

OTHER PUBLICATIONS

"Decomposition of M-ary CPM Signals into PAM Waveforms", Umberto Mengali, IEEE Transactions On Information Theory, vol. 41, No. 5, Sep. 1995, pp. 1265-1275.

"PAM Decomposition of M-ary multi-h CPM", Erik Perrins, et al., IEEE, pp. 1-30.

* cited by examiner

METHOD AND APPARATUS FOR GENERATING M-ARY CPM WAVEFORMS FROM A SUPERPOSITION OF PAM WAVEFORMS

TECHNICAL FIELD

The present invention relates to an M-ary constant phase modulated signal, and is particularly directed to decomposing that signal into a superposition of pulse amplitude modulation signals with high accuracy, and communicating with the decomposed signal.

BACKGROUND

M-ary signaling can be regarded as a waveform coding procedure, and refers specifically to signal processing where the processor accepts k data bits at a time and instructs the modulator to produce one of $M=2^k$ waveforms. Binary signaling (M=2) is the special case where k=1. Typically, M-ary refers to non-binary and that convention is continued throughout this disclosure, but the distinction is also made explicit in certain instances. For pulse amplitude modulation (PAM), the signaling order M refers to the number of unique discrete amplitude values over which the pulse is allowed to vary. Instead of transmitting a pulse waveform for each bit (where the rate would be R bits per second), parse the data into k-bit groups and then use $M=2^k$-level pulses for transmission. Each pulse waveform then represents a k-bit symbol moving at the rate of R/k symbols per second, which reduces the required bandwidth as compared to pulse-modulating each bit because symbols are transmitted as opposed to bits, though at a rate slower by a factor of k. As M (and k) increases, the receiver finds it more difficult to distinguish between, for example, octal pulses (M=8) versus binary pulses (M=2). The result in the prior art is that, as k increases (higher order M-ary signaling) with orthogonal signaling, error performance increases or the required signal to noise ratio SNR (technically $E_b/N_0$) is reduced, at the expense of bandwidth. For non-orthogonal signaling, the tradeoff is reversed in that increasing k improves bandwidth at the expense of lower error performance or increased SNR.

Constant phase modulation (CPM, also known as continuous phase modulation due to its smooth phase transitions between symbols) is a signal modulation technique that increases bandwidth efficiency by smoothing the waveforms in the time domain. Bandwidth efficiency is gained by concentrating the signal's energy in a narrower bandwidth, enabling adjacent signals to be packed closer together. Inherent in this smoothness is the fact that symbol transition features are muted, and many symbol synchronization schemes depend on those transition features being definite. To smooth the time domain signal, various CPM techniques generally rely on one or more of the following features: using signal pulses with several orders of continuous derivatives; intentionally injecting some intersymbol interference so that individual pulses occupy more than one signal time interval; and reducing the maximum allowed phase change per symbol interval.

As a cursory description of CPM, a binary single-h CPM waveform can be expressed over the nth symbol interval as $$s(t, a, h) = \exp\left\{j2\pi h \sum_{i=-\infty}^{n} a_i q(t - iT)\right\}, \quad nT \le t < (n+1)T; \quad [1]$$

where t denotes time, T denotes the symbol duration, $a_i \in \{\pm 1\}$ are the binary data bits and h is the modulation index. The modulation index h is the ratio of the frequency deviation to the frequency of the modulating wave, when using a sinusoidal wave as in CPM. The phase function, q(t), is the integral of the frequency function, $f(t)$, which is zero outside of the time interval (0,LT) and which is scaled such that $$\int_0^{LT} f(\tau) d\tau = q(LT) = \frac{1}{2}. \quad [2]$$

An M-ary single-h CPM waveform is the logical extension of the binary single-h case in which the information symbols are now multi-level: i.e., $a_i \in \{\pm 1, \pm 3, \ldots, \pm(M-1)\}$.

Finally, an M-ary multi-h CPM waveform can be written as $$s(t, a, h) = \exp\left\{j2\pi \sum_{i=-\infty}^{n} a_i h_i q(t - iT)\right\}, \quad nT \le t < (n+1)T \quad [3]$$

where $a_i \in \{\pm 1, \pm 3, \ldots, \pm(M-1)\}$ and the modulation index, $h_n$ assumes it value over the set: $\{h(1) \ldots, h(N_h)\}$. In one implementation, for example, the modulation index may cycle over the set of permitted values.

In his seminal work entitled "Exact and Approximate Construction of Digital Phase Modulations by Superposition of Amplitude Modulation Pulses (AMP)", *IEEE Transactions on Communications*, vol. COM-34, No. 2, February 1986, pp. 150-160, P. A. Laurent has shown that any binary single-h CPM signal can be exactly represented by the superposition of pulse-amplitude modulation (PAM) waveforms.

$$s(t, a, h) = \exp\left\{j2\pi h \sum_i a_i q(t - iT)\right\} \quad [4]$$

$$= \sum_{k=0}^{Q-1} \sum_n b_{k,n} c_k(t - nT), \quad Q = 2^{L-1}.$$

This is termed the Laurent Decomposition, and $a_i \in \{\pm 1\}$, and $\{b_{k,n}\}$ represents the pseudo-data symbols, which are obtained in a nonlinear fashion from the binary data symbols. Laurent lays the theoretical groundwork in the above paper for representing any constant amplitude binary phase modulation as the sum of a finite number of time-limited pulse amplitude-modulated pulses. Hence, Laurent shows that binary single-h CPM, which may be appear to be rather complex in its classical representation (equation [1]), can be replaced by a much simpler notation by using what has become known as the Laurent Decomposition.

The Laurent Decomposition of equation [4] expresses a binary single-h CPM signal as the sum of $2^{L-1}$ PAM waveforms (where L denotes the number of symbol intervals over which its frequency function is defined). The Laurent pulses, $c_k(t)$, are obtained from the phase response of the CPM signal. An important characteristic of these pulses is that the signal energy is unevenly distributed amongst them and that the pulses are distinctively ordered. Thus, $c_0(t)$ is usually the "main pulse", which carries most of the signal energy (often upwards of 95%), $c_i(t)$ contributes much less energy and the last pulse $c_{Q-1}(t)$ contributes the least amount of energy. Thus, in many cases of practical interest, the CPM waveform can be approximated using only the PAM construction of the "main pulse"

$$s(t, a, h) \approx \sum_n b_{0,n} c_0(t - nT). \quad [5]$$

Because the pulses of Laurent's approach are defined in order of decreasing energy, equation [5] can be broadened somewhat to sum the energy over the first pulse or over the first few pulses of the decomposition in order to synthesize an "almost binary single-h CPM" signal. Thus, for many cases of practical interest, the binary single-h CPM signal is well approximated as $$s(t, a, h) \approx \sum_{k=0}^{Q_0-1} \sum_n b_{k,n} c_k(t - nT), \quad 1 \leq Q_0 \leq Q = 2^{L-1}. \quad [6]$$

The Laurent Decomposition is important because it linearizes the binary CPM waveform, which greatly simplifies receiver algorithms for binary CPM by enabling them to use Laurent's linear approximation of the received CPM signal as a single pulse as in equation [5]. Equation [6] enables simplified design of "almost binary CPM" transmission schemes as well as for the simplification of receiver design algorithms by using only a few of the leading Laurent pulses rather than the true CPM waveform itself.

However, with increasing k (and thus increasing M in an M-ary waveform), further extensions of the Laurent Decomposition do not appear to preserve the mathematically elegant PAM signal structure that makes this decomposition so useful for generating approximations of binary single-h CPM waveforms.

Specifically, in a paper entitled "Decomposition of M-ary CPM Signals Into PAM Waveforms", *IEEE Transactions on Information Theory*, vol. 41, No. 5, September 1995, pp. 1265-1275, U. Mengali and M. Morelli extend the Laurent Decomposition to include multi-level (single-h) CPM signaling and show that M-ary single-h CPM waveforms have the following PAM decomposition $$s(t, a, h) = \exp\left\{j2\pi h \sum_i a_i q(t - iT)\right\} \quad [7]$$

$$= \sum_{k=0}^{N-1} \sum_n b_{k,n} g_k(t - nT), \quad N = Q^P(2^P - 1);$$

where a now denotes the M-ary data symbols $a_i \in \{\pm 1, \pm 3, \ldots, \pm (M-1)\}$, $Q = 2^{L-1}$, and P is an integer satisfying the conditions $$2^{P-1} < M \leq 2^P. \quad [8]$$

The Mengali and Morelli approach is seen to view an M-ary CPM signal as the product of P binary CPM waveforms, apply the Laurent Decomposition to each individual factor, and then write the final expression as the sum of PAM components. In general, this approach yields $2^{P-1}$ PAM component pulses of significant energy. Furthermore, unlike Laurent's solution for the binary case, their approach does not result in a PAM decomposition in which the component pulses are naturally defined in terms of decreasing signal energy.

E. Perrins and M. Rice also extend the Laurent Decomposition in two papers: "Optimal and Reduced Complexity Receivers for M-ary Multi-h CPM", Wireless Communications and Networking Conference 2004, pp. 1165-1170; and "PAM Decomposition of M-ary multi-h CPM", believed to be submitted to *IEEE Transactions on Communications* for future publication. The work of Perrins and Rice generalize the Laurent Decomposition by applying it to M-ary multi-h CPM waveforms. In their approach, Perrins and Rice first derive the PAM decomposition for the binary multi-h case and then extend this result to the general M-ary multi-h case in order to show that $$s(t, a, h) = \exp\left\{j2\pi \sum_i h_i a_i q(t - iT)\right\} \quad [9]$$

$$= \sum_{k=0}^{N-1} \sum_n b_{k,n} g_{k,\tilde{n}}(t - nT), \quad N = Q^P(2^P - 1).$$

The notation $\tilde{i} = i \bmod N_h$, where $N_h$ denotes the number of modulation indexes (i.e. $h = \{h(1), h(2), \ldots, h(N_h)\}$ and "mod" indicates modulo addition $\oplus$. An important distinction between equation [9] and the above work of Mengali and Morelli is that $\{g_{k,n}(t)\}$ is a now set of $N_h \cdot N$ component pulses. Note that the Perrins-Rice derivation results in the generation of $N_h \cdot 2^{P-1}$ "main pulses" that carry the most significant proportion of the total signal energy.

Each of the above extensions of the Laurent Decomposition is seen to not preserve its mathematical simplicity, which makes it so valuable in mirroring or approximating a binary CPM waveform. What is needed in the art is a method and apparatus to linearly decompose an M-ary CPM signal, with exact or reasonable approximation, so that efficient algorithms and hardware may be designed. This need is seen for both single-h and multi-h modulation. The Laurent Decomposition itself is seen as adequate for binary single-h CPM, so the need lies primarily in the area of non-binary single-h and all multi-h CPM decompositions.

SUMMARY

The foregoing and other problems are overcome, and other advantages are realized, in accordance with the presently preferred embodiments of these teachings.

In accordance with one aspect of the invention is a method of transmitting a signal. In this method, a signal is modulated onto an M-ary pulse-amplitude modulated PAM waveform that is a superposition of $Q_0 \leq 2^{L-1}$ PAM component pulses in each symbol interval such that a significant portion of the signal energy over each symbol interval of a burst is within the $Q_0$ PAM component pulses. The modulated signal is then transmitted. The value M is greater than 2 to indicate non-binary PAM, and L represents a number of symbol intervals. A significant portion is generally more than about 95% of signal energy, and preferably is about 98% or more of the signal energy. Where $Q_0 = 2^{L-1}$ component pulses, essentially all signal energy is within the superposition.

Another aspect of the invention is similar to the method immediately above, but the PAM waveform uses more than one modulating index and may be binary with M=2.

In accordance with another aspect of the invention is a transmitter that includes a signal source, a modulator configured to output an M-ary pulse-amplitude modulated PAM waveform, a multiplier, an antenna, and a processor coupled to a memory. The non-binary PAM waveform is a superposition of $Q_0 \leq 2^{L-1}$ PAM component pulses in each symbol interval. The processor configured to drive the modulator to shape the $Q_0$ PAM pulses in each symbol interval such that a significant portion of the signal energy for each symbol interval of a transmission burst is carried in that symbol interval's $Q_0$ PAM pulses.

Another embodiment of the invention is similar to the transmitter immediately above, but the modulator is configured to output a binary, multi-h pulse-amplitude modulated PAM waveform, where h>1 is a number of modulating indices.

In accordance with yet another embodiment, the present invention is a memory embodying a program of machine-readable instructions, executable by a digital data processor, to perform actions directed toward modulating an input signal. The actions include determining an M-ary pulse-amplitude modulated PAM waveform that is a superposition of $Q_0 \leq 2^{L-1}$ PAM component pulses in each symbol interval such that a significant portion of the signal energy over each symbol interval of a transmission burst is within the $Q_0$ PAM component pulses, and combining the M-ary PAM waveform with a signal to be transmitted, and transmitting the modulated signal. The term M is greater than two, so the PAM waveform is non-binary. The term L represents the number of symbol intervals over which the frequency function is defined (see Equation [2] for an example).

Another aspect of the invention is similar to the program immediately above, except the PAM waveform uses more than one modulating index and may be binary with M=2.

In accordance with another aspect, the invention is an apparatus for modulating a signal. The apparatus has signal source means, modulating means, and transmitting means. The modulating means is for determining, for each symbol interval of a transmission burst in which symbols are modulated over M>2 discrete amplitudes, a plurality of $Q_0$ pulses that are shaped such that the pulses are ordered by an amount of signal energy they carry, the modulator means further for superimposing the plurality of $Q_0$ pulses into a combined waveform with continuous phase that modulates an output of the signal means for transmission. The transmitting means is for transmitting the signal modulated on the combined waveform.

Another aspect of the invention is similar to the apparatus immediately above, except the PAM waveform uses more than one modulating index and may be binary with M=2.

Another aspect of the invention is an apparatus for receiving a signal. This apparatus has means for receiving a non-binary pulse amplitude modulated PAM signal that is characterized in that, for each symbol interval, a plurality of pulses that exhibit descending levels of signal energy. The apparatus further has demodulating means for demodulating symbols from the pulses.

Another aspect of the invention is similar to the apparatus immediately above, except the PAM waveform uses more than one modulating index and may be binary with M=2.

Yet another aspect of the invention is a memory embodying a program of machine-readable instructions, executable by a digital data processor, to perform actions directed toward demodulating a received signal. These actions include determining a generalized phase function of a received non-binary pulse amplitude modulated signal, deriving a function $g_{k,n}(t-nT)$ from the generalized phase function, where T is a symbol duration. The actions further include, for each $n^{th}$ symbol interval, resolving pseudo symbols $b_{k,n}$ using the function $g_{k,n}(t-nT)$, and then determining symbols from the pseudo symbols.

Another aspect of the invention is a method to construct a signal x(t, a, h). In the method, a function $g_{k,n}(t)$ is constructed and shifted by nT. The shifted function is multiplied by a pseudo symbol $b_{k,n}$, summed over $Q_0$ pulses, and the $Q_0$ pulses are summed over n symbols. In the above notation, t is a time index, $a=\{a_i\}$ represents a phase of a complex data h is a modulating index, and T is symbol duration. An exemplary mathematical representation of this method is shown at equation [29].

Further aspects and implementation details are given below.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF EMBODIMENTS OF THE INVENTION

Figure 1:
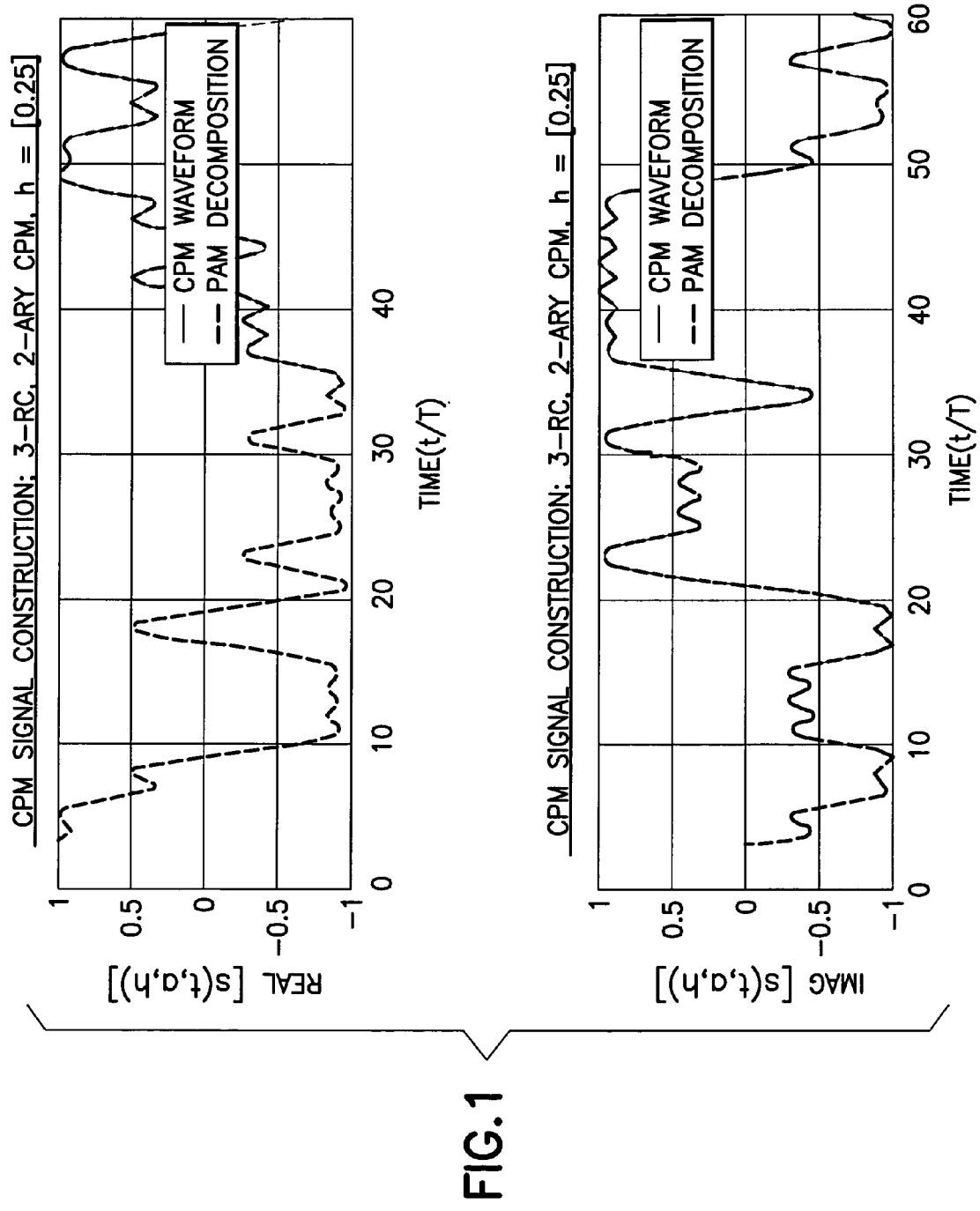
FIG. 1 is a two-part graph separately showing real and imaginary components of a binary single-h CPM waveform as compared to an exact PAM decomposition of that waveform using the present invention.

An analysis of the prior art extensions of Laurent's work detailed above indicates that they lose certain of the Laurent Decomposition's mathematical elegance and simplicity for the following reasons:

- The M-ary CPM decomposition yields several pulses of significant energy, so that the concept of a single "main pulse" for M-ary CPM does not exist. For example, the Mengali-Morelli decomposition of M-ary single-h CPM generates $2^{P-1}$ "main pulses" and the Perrins-Rice decomposition of M-ary multi-h CPM yields $N_h \cdot 2^{P-1}$ "main pulses", where P~$\log_2$M and $N_h$ denotes the number of modulation indices.
- The PAM component pulses in the M-ary CPM decomposition are not distinctively ordered as in the binary CPM case, which implies that it is not trivial to determine which of the component pulses contribute the most significant proportion of energy;
- The number of PAM component pulses in the decomposition of M-ary CPM is exponentially increased over the number of terms that are required in the expansion of binary single-h CPM.

The present invention can be used to decompose any CPM signal—whether binary CPM, M-ary single-h CPM or M-ary multi-h CPM—into an equivalent PAM waveform in a manner that preserves the mathematically elegant structure of the Laurent Decomposition for binary CPM waveforms.

Theorem: Below is shown that any CPM waveform (whether binary single-h, M-ary single-h, binary multi-h or M-ary multi-h) has the following PAM decomposition:

$$s(t, a, h) = \sum_{k=0}^{Q-1} \sum_{n} b_{k,n} g_{k,n}(t - nT), \quad Q = 2^{L-1} \quad [10]$$

where $b_{k,n}$ denotes the pseudo-data symbols, which are derived from the M-ary symbols in a non-linear fashion, and $g_{k,n}(t)$ denotes the PAM component pulses. Proof of equation [10] for all CPM waveforms is predicated upon the expression of any complex-baseband CPM waveform as a binary multi-h waveform.

Proof: Over the nth symbol interval, any complex-baseband CPM waveform may be expressed as $$s(t, a, h) = \exp\left\{ j2\pi \sum_{i=-\infty}^{n} a_i h_i q(t - iT) \right\}, \quad nT \leq t < (n+1)T \quad [11]$$

where T denotes the symbol duration, $a = \{a_i\}$ are the phases of the complex data symbol. Hence, they are binary random variables: $a_i \in \{\pm 1\}$. A pseudo-modulation index, $h_i$, may take on any one of the definitions found in Table 1, or may easily assume other definitions which are apart from those listed in table 1, but which are consistent with the upcoming derivation).

TABLE 1

Definition of $h_i$ used in the generalized binary multi-h interpretation of CPM signals.

| Definition of $h_i$ | CPM Scheme | Comments |
|---|---|---|
| $h_i = h$ | Binary single-h | Constant value of h. The number of modulation indexes, $N_h = 1$. |
| $h_i = h_{\underline{i}}$ | Binary multi-h | $\underline{i} = i \bmod N_h$. The modulation index cycles periodically through its set of permissible values. $N_h$ is equal to the number of values the modulation index can assume. |
| $h_i = h \cdot b_i$ | M-ary single-h | $b_i$ denotes the magnitude of the nth symbol, which is taken from the alphabet $\{+1, +3, \ldots, +(M-1)\}$. The modulation index, h, assumes a constant value. $N_h$ is equal to the number of data symbols transmitted. |
| $h_{\underline{i}} = h_{\underline{i}} \cdot b_i$ | M-ary multi-h | $b_i$ denotes the magnitude of the ith symbol, which is taken from the alphabet $\{+1, +3, \ldots, +(M-1)\}$. $h_i$ denotes the modulation index, which may cycle through a set of permitted values, or which may be otherwise defined. $N_h$ is equal to the number of data symbols transmitted. |

The phase pulse, q(t), is defined as the integral of the frequency pulse, $f(t)$. The frequency pulse is defined to be zero outside of the time interval (0,LT) and is scaled so that $$\int_0^{LT} f(\tau) d\tau = q(LT) = \frac{1}{2}. \quad [12]$$

as in equation [2] above. Over the Wtth symbol interval then, the CPM waveform is given by $$s(t, a, h) = \exp\left( j\pi \sum_{m=-\infty}^{n-L} a_m h_m \right) \prod_{i=0}^{L-1} \exp(j2\pi a_{n-i} h_{n-i} q(t - (n-i)T)), \quad [13]$$

$$nT \leq t \leq (n+1)T.$$

Laurent has shown that when $a_n \in \{\pm 1\}$ $$\exp(j2\pi a_n h_n q(t - nT)) = \quad [14]$$
$$\frac{\sin(\pi h_n - 2\pi h_n q(t - nT))}{\sin(\pi h_n)} + \exp\{j\pi a_n h_n\} \frac{\sin(2\pi h_n q(t - nT))}{\sin(\pi h_n)}$$

We note that this expression is only meaningful for non-integer values of the pseudo-modulation index, $h_n$, (i.e. when $\sin(\pi h_n) \neq 0$).

Now, rewriting the signal $$s(t, a, h) = \exp\left( j\pi \sum_{m=-\infty}^{n-L} a_m h_m \right) \quad [15]$$
$$\prod_{i=0}^{L-1} \left[ \frac{\sin(\pi h_{n-i} - 2\pi h_{n-i} q(t - (n-iT)))}{\sin(\pi h_{n-i})} + \exp\{j\pi a_{n-i} h_{n-i}\} \frac{\sin(2\pi h_{n-i} - q(t - (n-iT)))}{\sin(\pi h_{n-i})} \right],$$

$$nT \leq t \leq (n+1)T$$

A generalized phase function is now introduced, which is non-zero over the interval (0,2LT) and which it is defined as follows $$u_{j,i}(\tau) = \begin{cases} \dfrac{\sin(2\pi h_i q(jT+\tau))}{\sin(\pi h_i)}, & 0 \le j \le L-1 \\ \dfrac{\sin(\pi h_i - 2\pi h_i q((j-L)T+\tau))}{\sin(\pi h_i)}, & L \le j \le 2L-1 \\ 0, & \text{otherwise.} \end{cases} \quad [16]$$

The time variable, $\tau = t \bmod T$.

Using this definition, the signal may be expressed as $$s(t,a,h) = \exp\left(j\pi \sum_{m=-\infty}^{n-L} a_m h_m\right) \prod_{i=0}^{L-1} [u_{i+L,n-i}(\tau) + \exp\{j\pi a_{n-i} h_{n-i}\} u_{i,n-i}(\tau)], \quad [17]$$

$$nT \le t \le (n+1)T.$$

The product actually yields a total of $2^L$ terms. However, Laurent has shown that many of these terms are similar and that they can be grouped into $2^{L-1}$ pulses of various lengths. For example, when L=3, we obtain an expression that has eight terms:

$$\begin{aligned}s(t,a,h) = &\, b_{0,n} \cdot u_{0,n} \cdot u_{1,n-1} \cdot u_{2,n-2} + b_{0,n-1} \cdot u_{1,n-1} \cdot u_{2,n-2} \cdot u_{3,n} + \\ &\, b_{0,n-2} \cdot u_{2,n-2} \cdot u_{3,n} \cdot u_{4,n-1} + b_{0,n-3} \cdot u_{3,n} \cdot u_{4,n-1} \cdot u_{5,n-2} + \\ &\, b_{1,n} \cdot u_{0,n} \cdot u_{4,n-1} \cdot u_{2,n-2} + b_{1,n-1} \cdot u_{1,n-1} \cdot u_{5,n-2} \cdot u_{3,n} + \\ &\, b_{2,n} \cdot u_{0,n} \cdot u_{1,n-1} \cdot u_{5,n-2} + b_{3,n} \cdot u_{0,n} \cdot u_{4,n-1} \cdot u_{5,n-2}\end{aligned} \quad [18]$$

$$nT \le t \le (n+1)T$$

(where the dependence on $\tau$ is understood). The pseudo-symbol is defined as $$b_{k,n} = \exp\left\{j\pi\left[\sum_{m=-\infty}^{n-L} h_m a_m - \sum_{i=0}^{L-1} h_{n-i} a_{n-i} \alpha_{k,i}\right]\right\} \quad [19]$$

and $\alpha_{k,i}$ (i=1, ..., L−1) is the ith bit in the radix-2 representation of k.

$$k = \sum_{i=1}^{L-1} 2^{i-1} \alpha_{k,i}, \quad [20]$$

$$0 \le k \le 2^{L-1} - 1.$$

$\alpha_{k,0}=0$ for all k. From expression [18], we observe that the pseudo-symbol $b_{0,n}$ modulates the signal over four symbol intervals.

Close inspection of expression [16] reveals that we can define the following four functions $$g_{0,n}(t) = \begin{cases} u_{0,n}(\tau) u_{1,n-1}(\tau) u_{2,n-2}(\tau), & 0 \le t < T \\ u_{1,n}(\tau) u_{2,n-1}(\tau) u_{3,n+1}(\tau), & T \le t < 2T \\ u_{2,n}(\tau) u_{3,n-1}(\tau) u_{4,n+1}(\tau), & 2T \le t < 3T \\ u_{3,n+3}(\tau) u_{4,n+2}(\tau) u_{5,n+1}(\tau), & 3T \le t < 4T \\ 0, & \text{otherwise.} \end{cases} \quad [21]$$

$$g_{1,n}(t) = \begin{cases} u_{0,n}(\tau) u_{4,n-1}(\tau) u_{2,n-1}(\tau), & 0 \le t \le T \\ u_{1,n}(\tau) u_{5,n-1}(\tau) u_{3,n+1}(\tau), & T \le t \le 2T \\ 0, & \text{otherwise.} \end{cases} \quad [22]$$

$$g_{2,n}(t) = \begin{cases} u_{0,n}(\tau) u_{1,n-1}(\tau) u_{5,n-1}(\tau), & 0 \le t \le T \\ 0, & \text{otherwise.} \end{cases} \quad [23]$$

$$g_{3,n}(t) = \begin{cases} u_{0,n}(\tau) u_{4,n-1}(\tau) u_{5,n-2}(\tau), & 0 \le t \le T \\ 0, & \text{otherwise.} \end{cases} \quad [24]$$

Consequently, for L=3, we may write $$s(t,a,h) = \sum_{k=0}^{Q-1} \sum_n b_{k,n} g_{k,n}(t-nT), \quad [25]$$

$$Q = 2^{L-1} = 4$$

This formulation generalizes nicely to all of the other cases, so that any CPM signal, s(t,a,h), can be decomposed into the superposition of PAM waveforms $$s(t,a,h) = \sum_{k=0}^{Q-1} \sum_n b_{k,n} g_{k,n}(t-nT), \quad [26]$$

$$Q = 2^{L-1}.$$

where the component pulse is defined as $$g_{k,n}(t) = \prod_{j=0}^{L-1} u_{v(k,j,t),w(n,j,t)}(\tau) \quad [27]$$

$$v(k,j,t) = j + m + L\alpha_{k,j}$$

$$w(n,j,t) = \begin{cases} (n+m-(j+m)\bmod L)\bmod N_h, & h_n = h_{\underline{n}} \\ (n+m-(j+m)\bmod L), & \text{otherwise} \end{cases}$$

$$\tau = t \bmod T$$

$$m = \left\lfloor \frac{t}{T} \right\rfloor.$$

Note that the same definition of v(k,j,t) also appears in Laurent's work. In addition, when $N_h=1$, then w(n,j,t)=0 and the expression for the signal pulses simplifies to the equivalent expression for binary CPM that is found in the Laurent Decomposition of binary CPM waveforms.

As in the Laurent Decomposition of binary single-h CPM, it is also observed that the durations of the component pulses for M-ary CPM are defined as follows $$g_{0,n}(t) \ldots (L+1)T$$

$$g_{1,n}(t) \ldots (L-1)T$$

$g_{2,n}(t), g_{3,n}(t) \ldots (L-2)T$ $g_{4,n}(t), g_{5,n}(t), g_{6,n}(t), g_{7,n}(t) \ldots (L-3)T$ $g_{Q/2,n}(t), \ldots g_{Q-1,n}(t) \ldots T$ [28]

In general, the kth component pulse, $g_{k,n}(t)$, is non-zero over the interval $0 \leq t \leq T \times \min_{i=1,2,\ldots,L-1}[L(2-\alpha_{k,i})-i]$.

There are three important differences between the decomposition of equation [26] and those obtained in the work detailed above by Laurent; Mengali and Morelli; and Perrins and Rice.

The number of PAM components that are required to represent the signal over each symbol interval is equal to $Q=2^{L-1}$, as in the original Laurent Decomposition.

We have observed $g_{0,n}(t)$ to be the pulse of longest duration $(L+1)T$ and it also happens to be the pulse that contributes most significantly to the total signal energy. This finding suggests the possibility of approximating the PAM representation of the signal using one pulse of length $(L+1)T$.

The shape of the main pulse is dependent on the transmitted data. Hence, this shape can change from one interval to the next.

Based on the proof outlined in this section, we now propose synthesis of the following waveform at the transmitter $$x(t, a, h) = \sum_{k=0}^{Q_0-1} \sum_n b_{k,n} g_{k,n}(t-nT),$$ [29]

$1 \leq Q_0 \leq Q;$ $(Q = 2^{L-1}).$ where $x(t,a,h)=s(t,a,h)$ when $Q_0=Q$.

Equation [29] is the mathematical embodiment of this invention upon which a transmitter architecture may be developed, and upon which software code to drive the modulation may be based. As software, it may be a program of machine readable instructions tangibly embodied on a computer readable storage medium such as a volatile or non-volatile memory of a mobile station or other wireless communications device. The instructions are executable by a processor such as a digital signal processor, The appropriate value of $Q_0$ can be selected according to a particular performance criterion. If, for example, transmitter complexity is the primary concern, then selecting $Q_0=1$ yields a signal that closely approximates CPM with minimum complexity. As a second example, let us suppose that the transmitted waveform should contain T % of the total CPM signal energy. Then, $Q_0$ should be the smallest value such that the approximation error is within (1−T) % of the total signal energy. As a final example, $Q_0$ can also be selected such that the resulting waveform satisfies an upper bound constraint on the Peak-to-Average-Power Ratio (PAPR).

Figure 2:
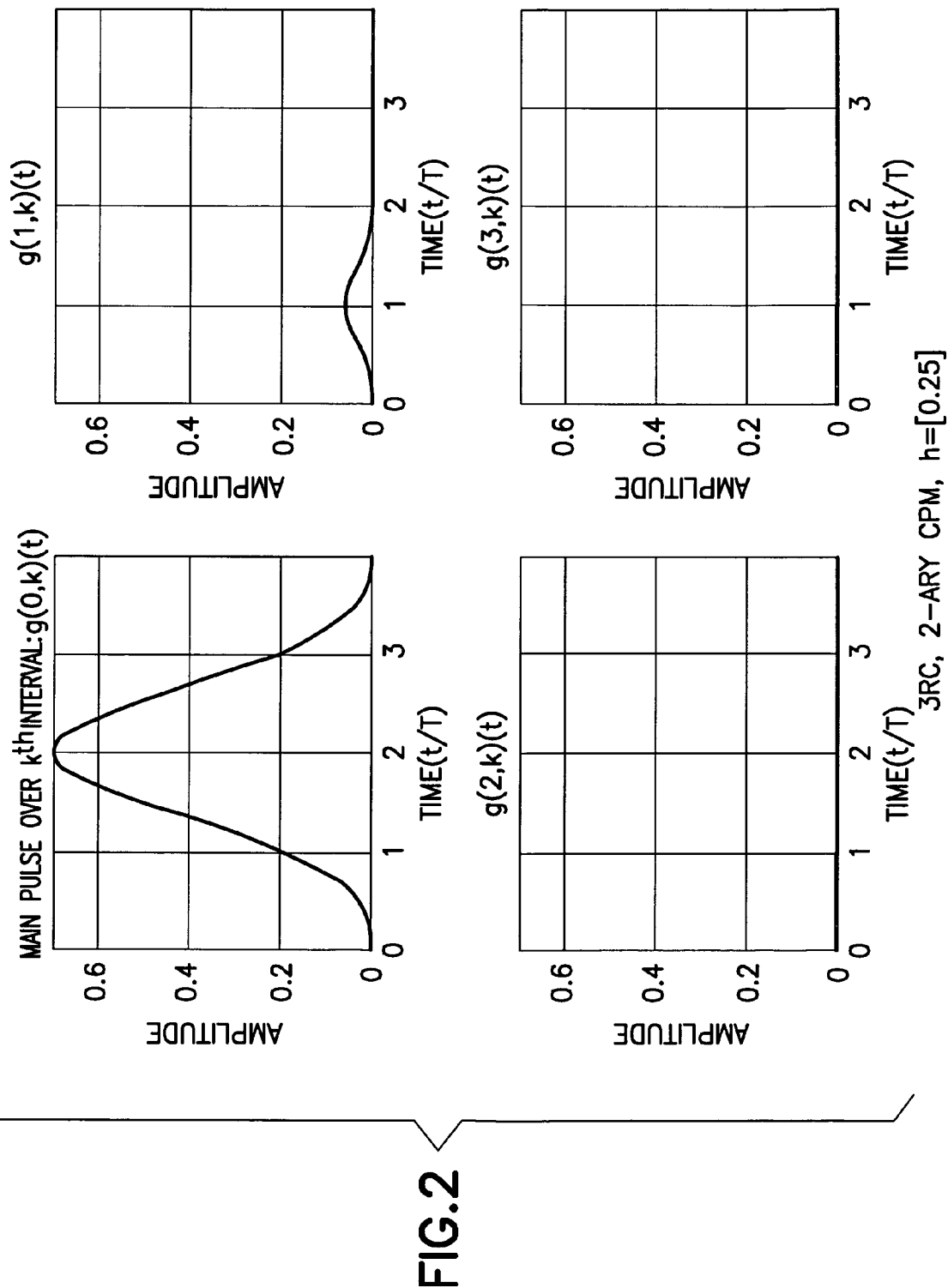
FIG. 2 is a series of four graphs showing energy of different pulses in a single symbol interval for the waveform of FIG. 1.
Figure 3:
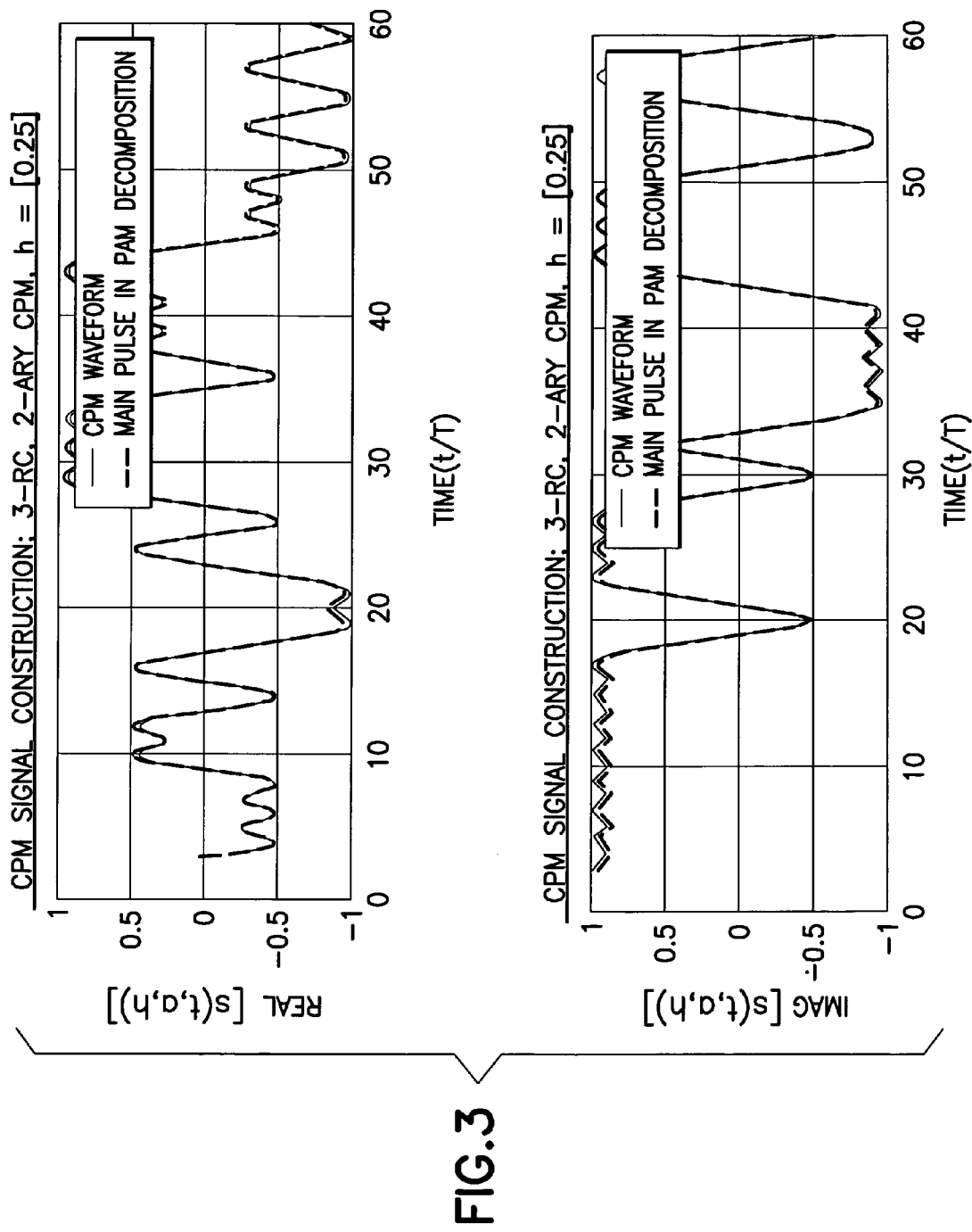
FIG. 3 is similar to FIG. 1, but showing a PAM approximation using only the first pulse of that same CPM waveform modulation as used for FIG. 1.

A quantitative analysis of the accuracy of the present invention is now presented with reference to the drawing figures. FIGS. 1-3 represent PAM decomposition, according to an embodiment of the present invention, of a binary, single-h CPM signal, with M=2; h=4/16; L=3; $Q=2^{L-1}=4$; raised cosine. FIGS. 1 and 3 show both real and imaginary component separately. FIG. 1 illustrates an exact PAM decomposition compared to the waveform, and FIG. 3 illustrates an approximation based only on the main (first) pulse. That the two distinct plot lines appear as one in each of FIGS. 1 and 3 indicate just how accurate the PAM decomposition according to the present invention can be to the true CPM waveform. FIG. 2 shows the first four pulses over a symbol interval. Clearly, the majority of energy is within only the first pulse. It is noted that the pulses are distinct, and naturally defined in order of descending signal energy g(0, k)(t) to g(3,k)(t).

Figure 4:
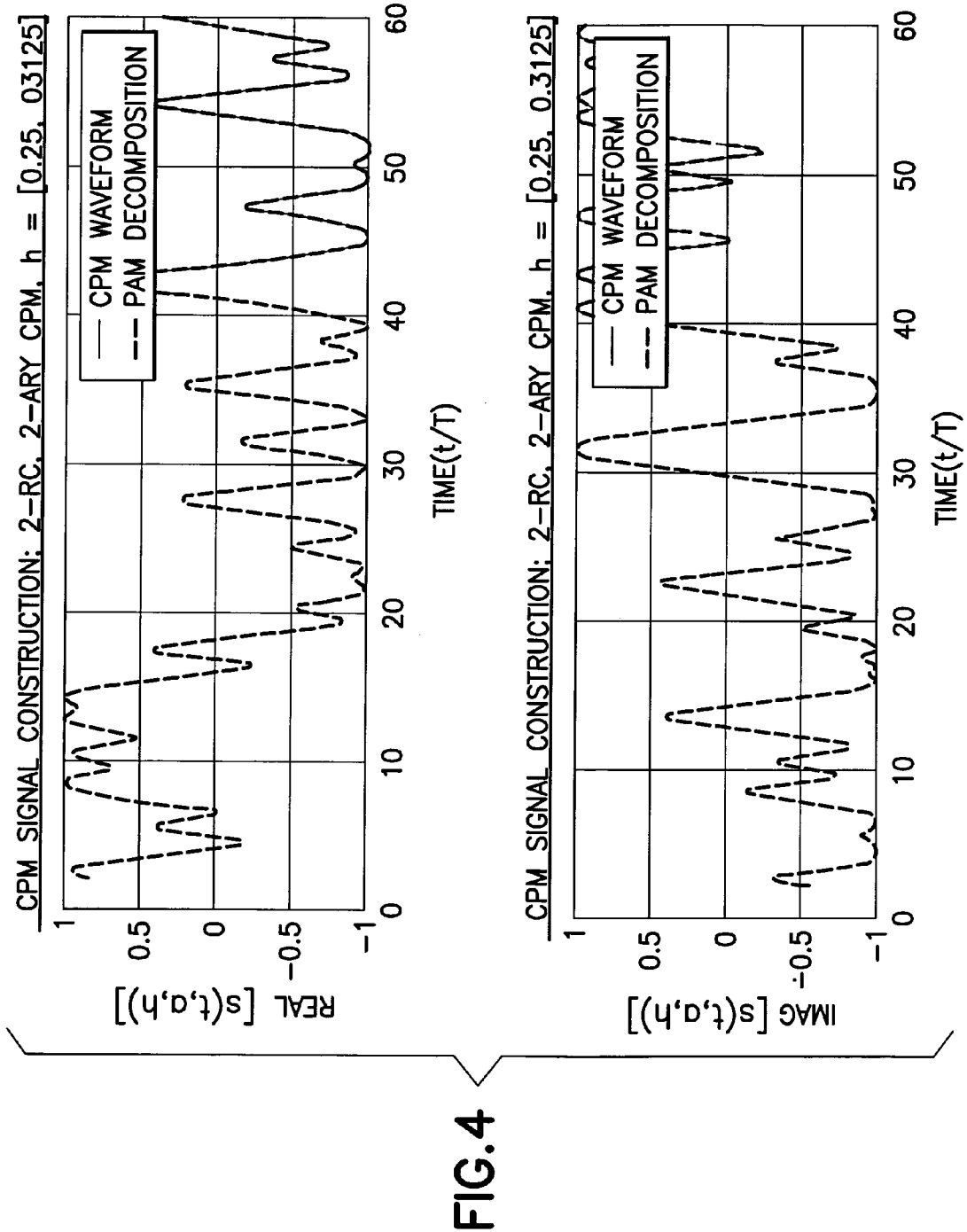
FIG. 4 is similar to FIG. 1, but for a binary multi-h CPM waveform.
Figure 5:
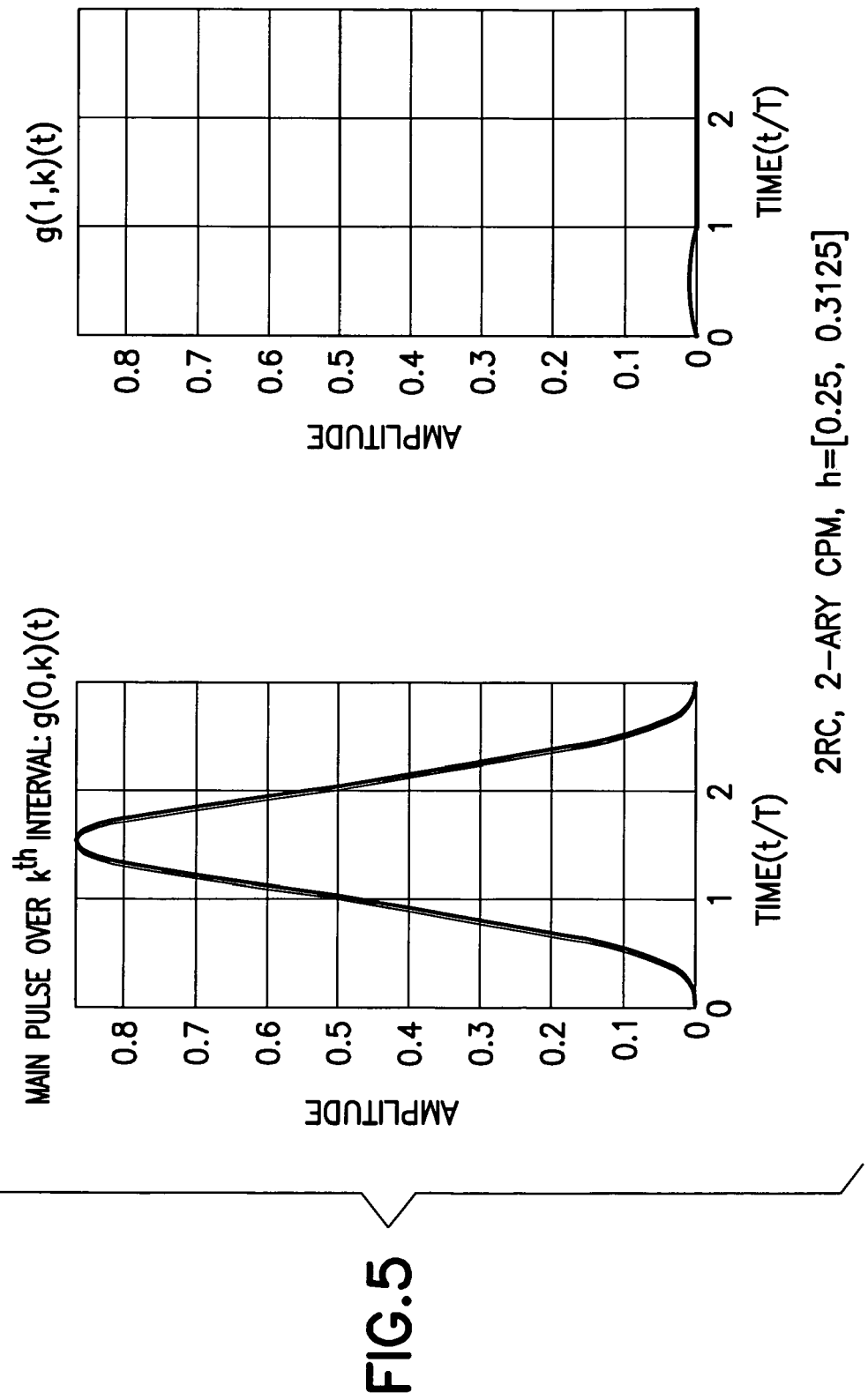
FIG. 5 is a series of two graphs showing one main pulse with highest energy and one secondary pulse carrying much less energy in a single symbol interval for the waveform of FIG. 4.
Figure 6:
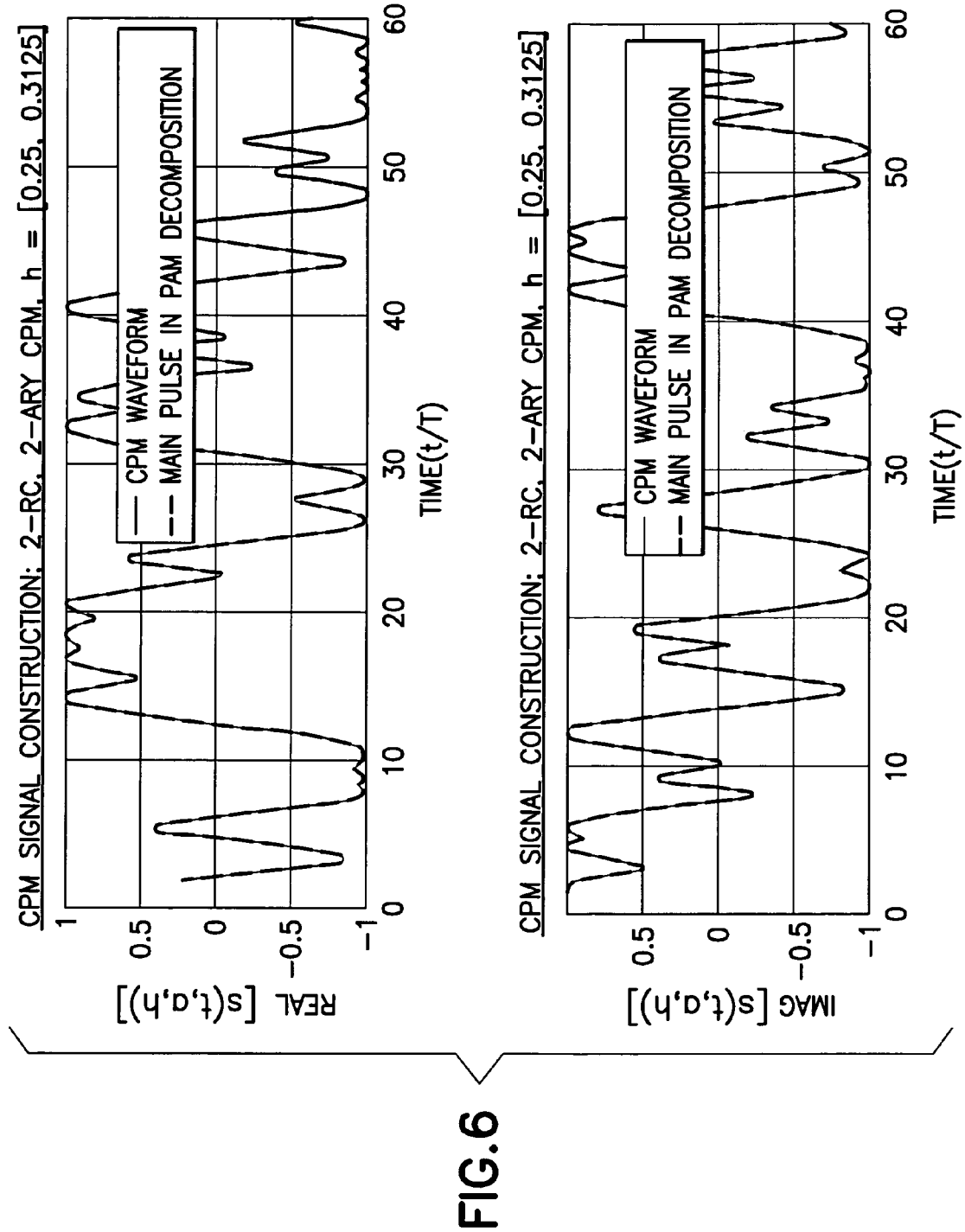
FIG. 6 is similar to FIG. 4, but showing a PAM approximation using only the first pulse from FIG. 5.

FIGS. 4-6 illustrate similarly for the case of a binary multi-h CPM waveform, but where M=2; h=⌊4/16, 5/16⌋; L=2; $Q=2^{L-1}=2$; raised cosine. As with FIGS. 1 and 3, the dual plot lines in each graph of FIGS. 4 (exact) and 6 (approximation) are identical to the scale illustrated. FIG. 5 illustrates the first two pulses of a symbol interval. As with FIG. 2, the majority of symbol energy is contained within the first pulse, so the approximation of FIG. 6, which uses that first pulse, is accurate to relatively high tolerance.

Figure 7:
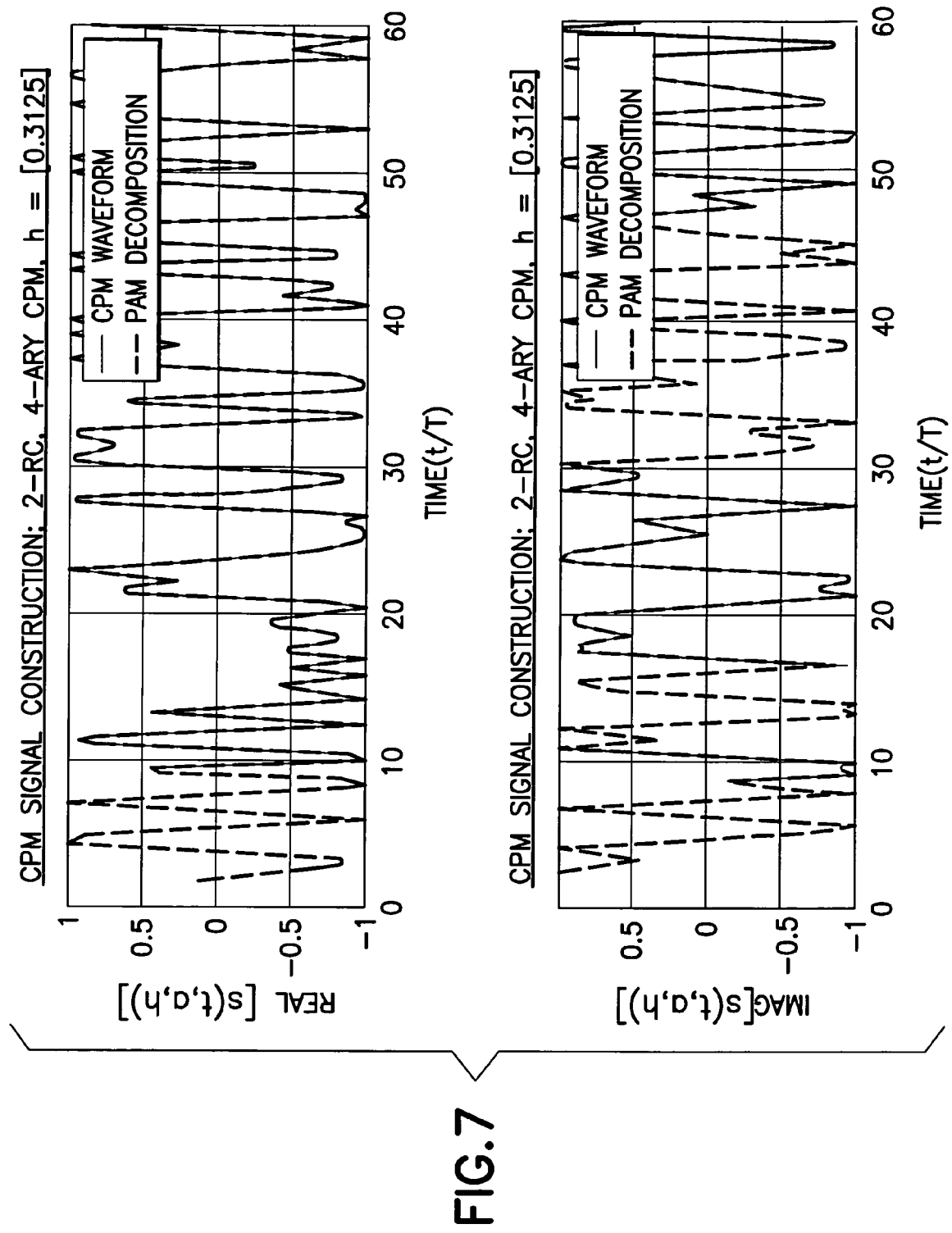
FIG. 7 is similar to FIG. 1, but for a (non-binary) M-ary single-h CPM waveform.
Figure 8:
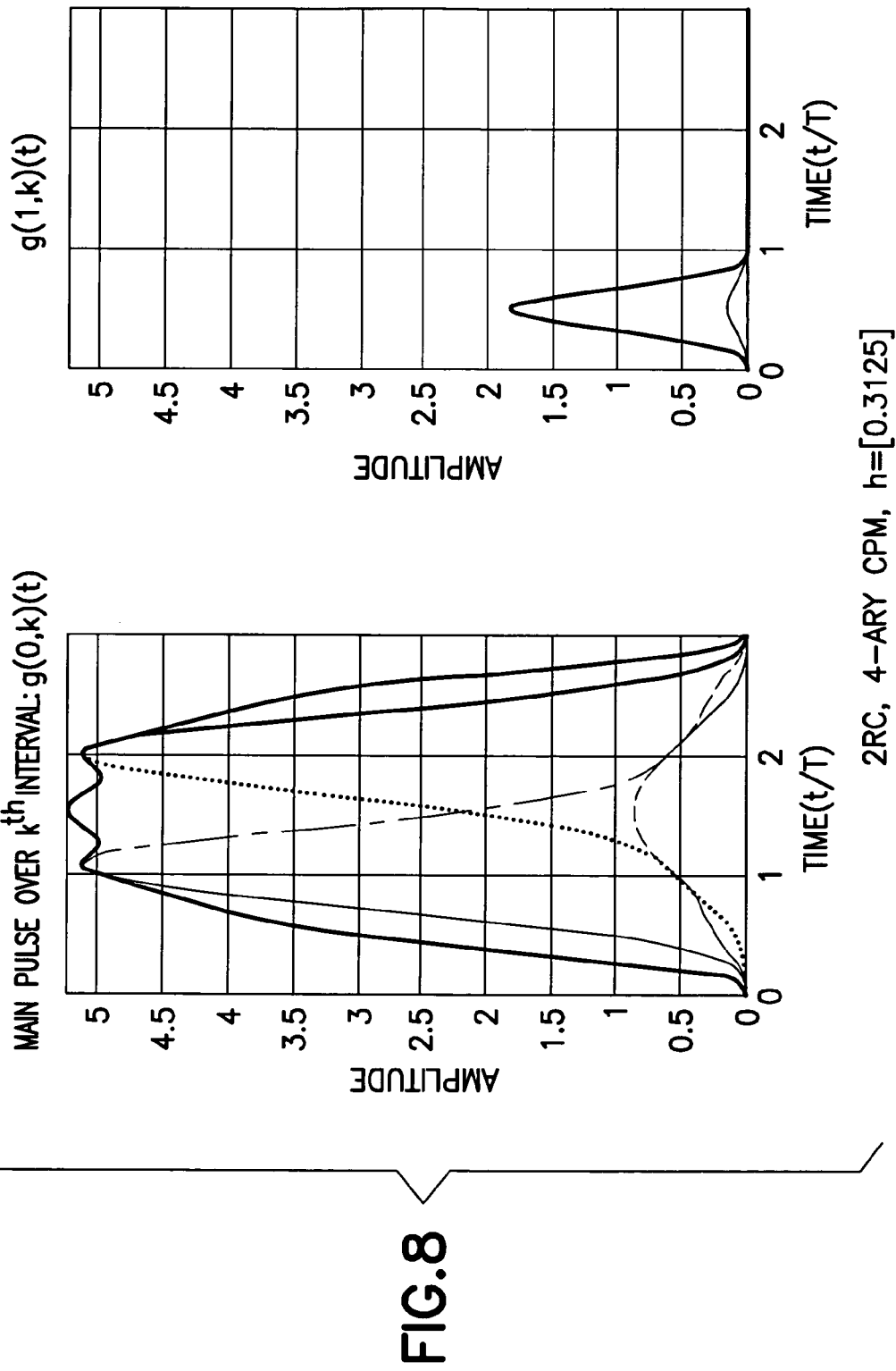
FIG. 8 is a series of two graphs showing one main pulse with highest energy and one secondary pulse carrying much less energy in a single symbol interval for the waveform of FIG. 7.
Figure 9:
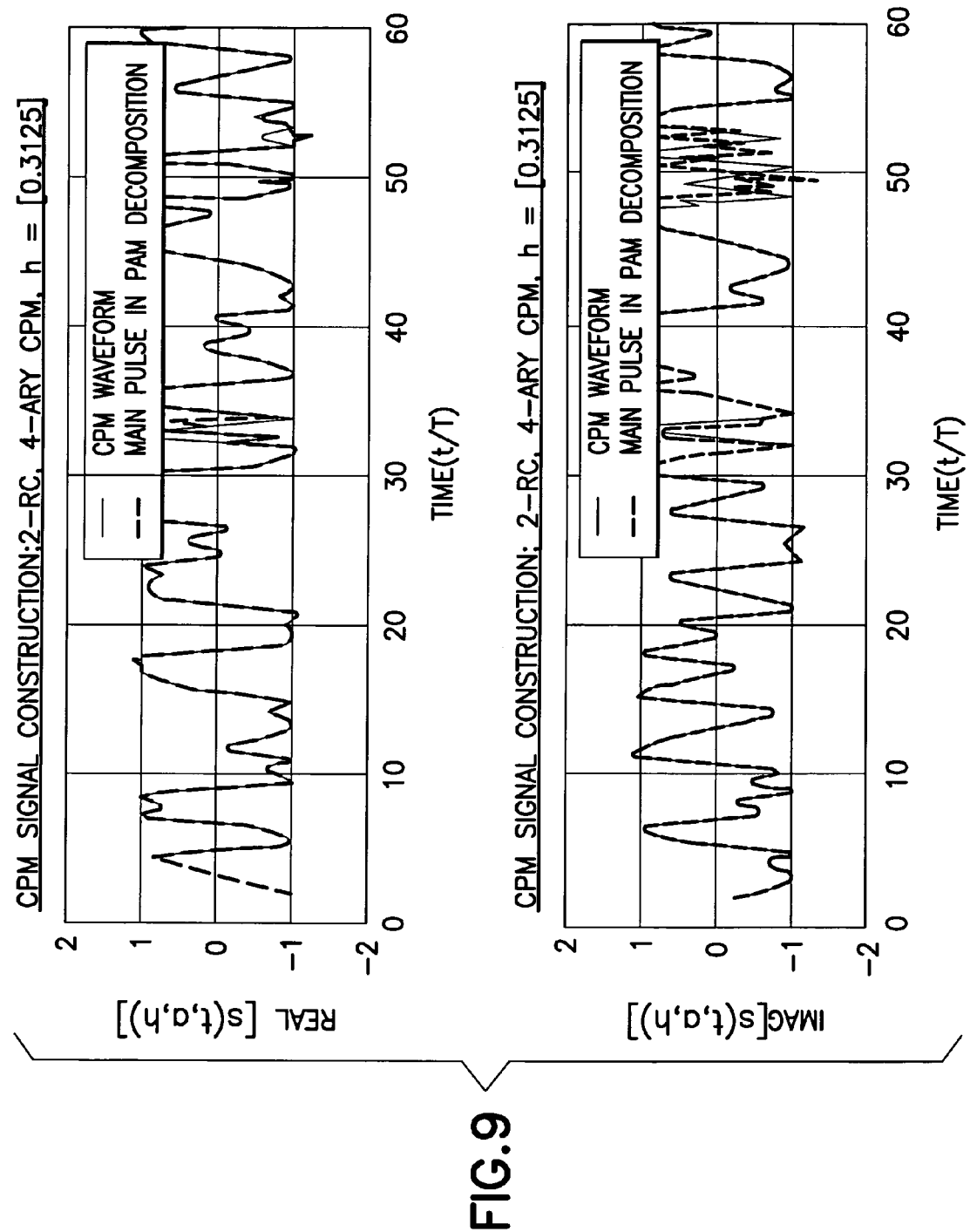
FIG. 9 is similar to FIG. 7, but showing a PAM approximation using only the first pulse from FIG. 8.

FIGS. 7-9 illustrate similarly for the case of a non-binary M-ary single-h CPM waveform, but where M=4; h=5/16; L=2; $Q=2^{L-1}=2$; raised cosine. [Note that this waveform as well as that of FIGS. 10-12 corresponds to an advanced range telemetry (ART) CPM waveform adopted by the Range Commander's Council in its IRIG-1-6 standard.] The exact and approximation PAM decompositions of FIGS. 7 and 9, respectively, very closely track the true CPM waveform, as they did with FIGS. 1 and 3 for the binary single-h waveform, and with FIGS. 4 and 6 for the binary multi-h waveform. Like FIG. 5, FIG. 8 shows the first two pulses of a symbol interval, of which the first pulse carries the majority of symbol energy and is used in the PAM approximation of FIG. 9. Note that in FIG. 8, a few component pulses have an amplitude that exceeds unity. However, the component pulses are superimposed and interleaved in such a way that the resulting waveform has a constant envelope of unity.

Figure 10:
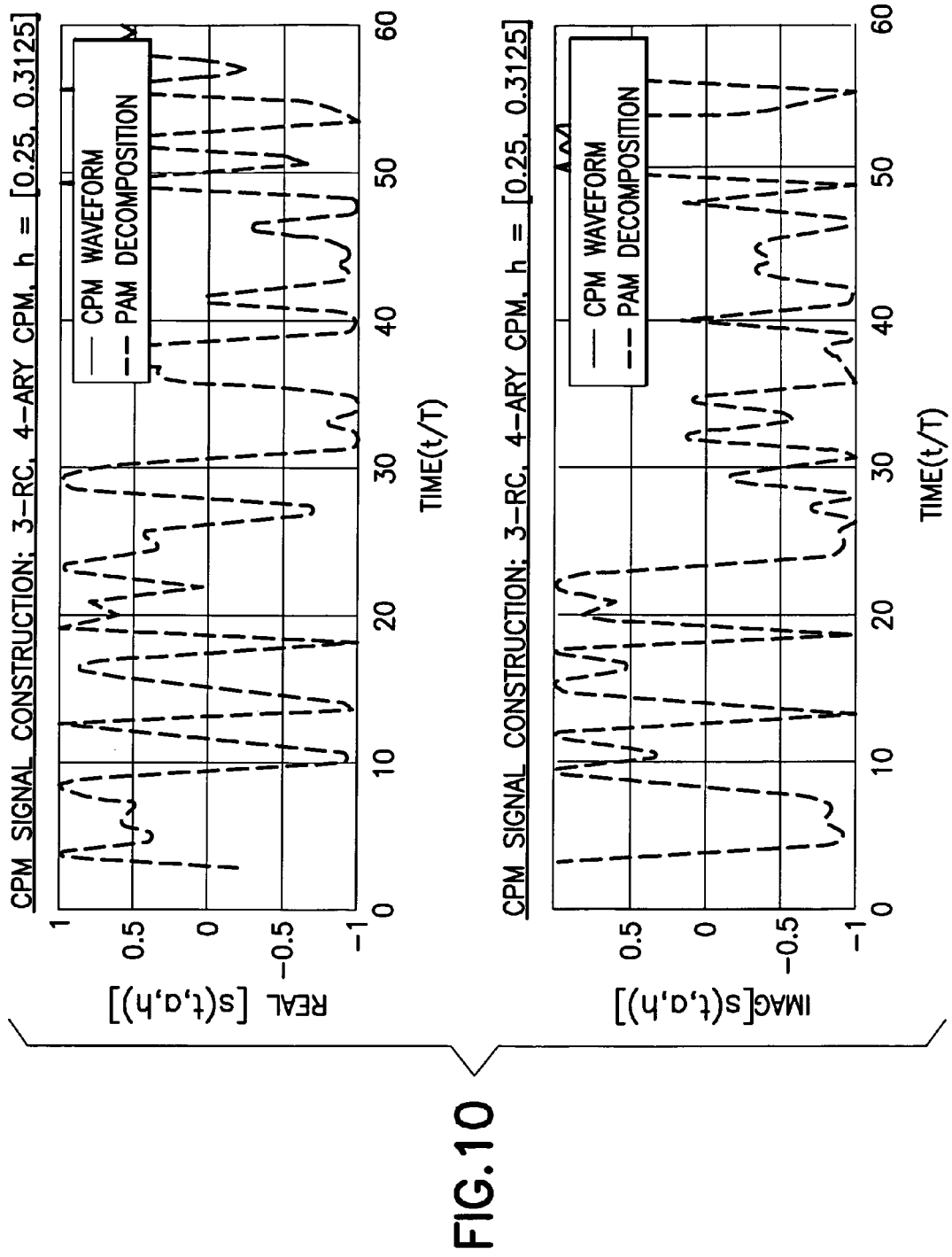
FIG. 10 is similar to FIG. 1, but for a (non-binary) M-ary multi-h CPM waveform.
Figure 11:
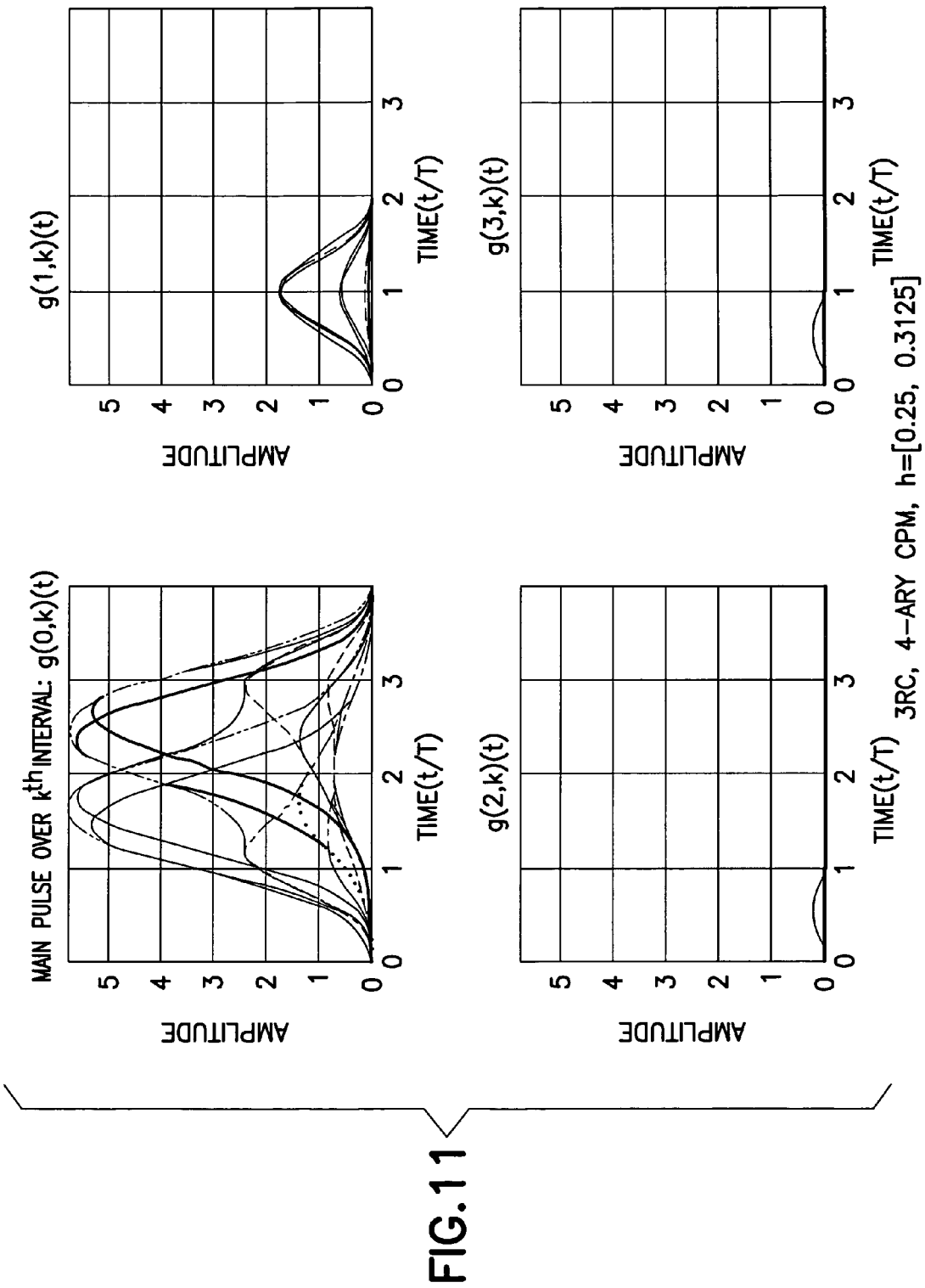
FIG. 11 is a series of four graphs showing one main pulse with highest energy and three secondary pulses each carrying much less energy in a single symbol interval for the waveform of FIG. 10.
Figure 12:
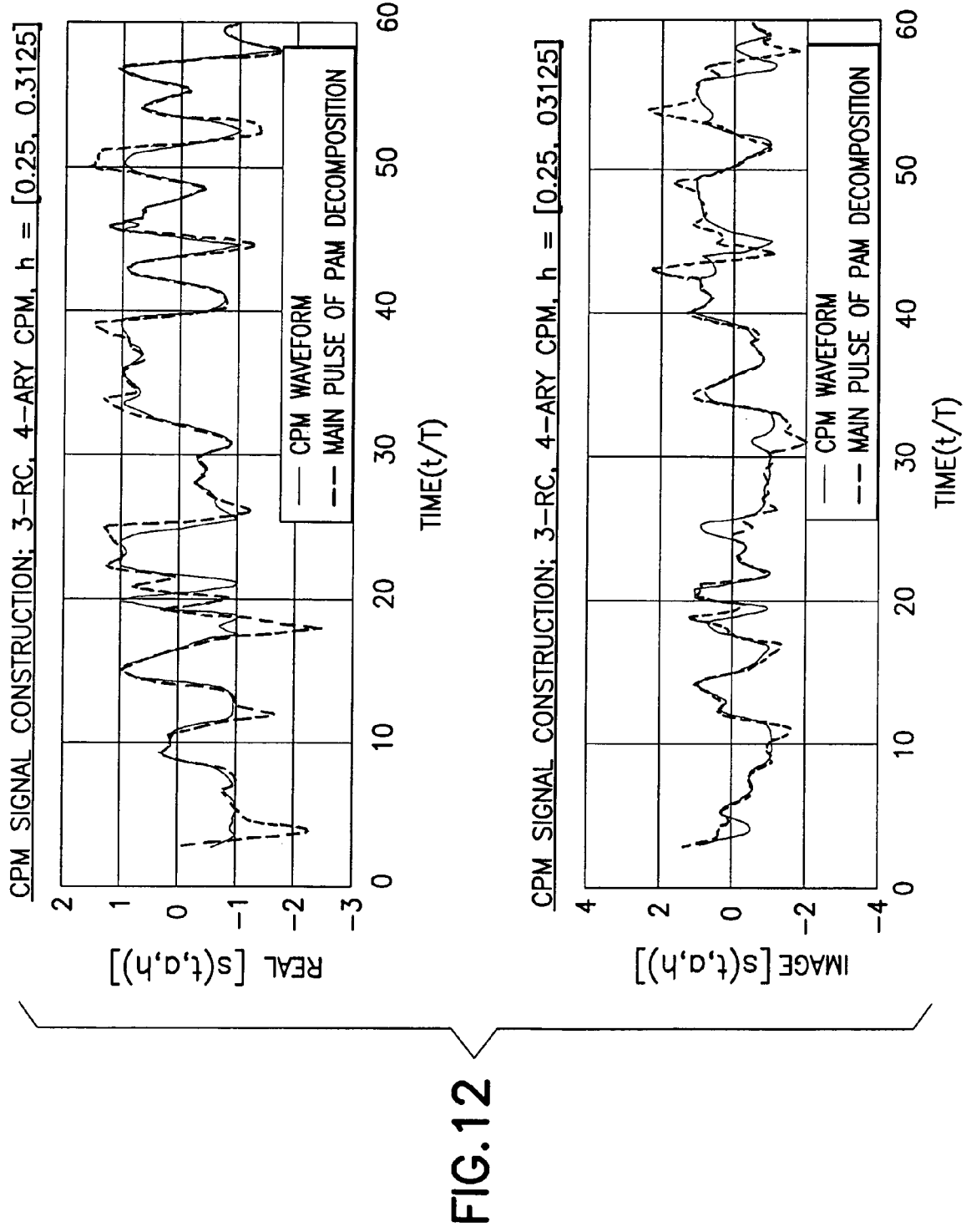
FIG. 12 is similar to FIG. 10, but showing a PAM approximation using only the first pulse from FIG. 11.

FIGS. 10-12 illustrate similarly for the final waveform, non-binary M-ary, multi-h CPM, where M=4; h=⌊4/16, 5/16⌋; L=2; $Q=2^{L-1}=4$; raised cosine. With the illustrated resolution, it is only seen in the PAM approximation of FIG. 12 some divergence between the CPM signal and the PAM approximation, yet they still track one another closely. The four part graph of FIG. 11 shows the majority of symbol energy in the first pulse, with the proviso as noted above with respect to FIG. 8 concerning those secondary pulses with amplitude greater than unity.

Figure 13:
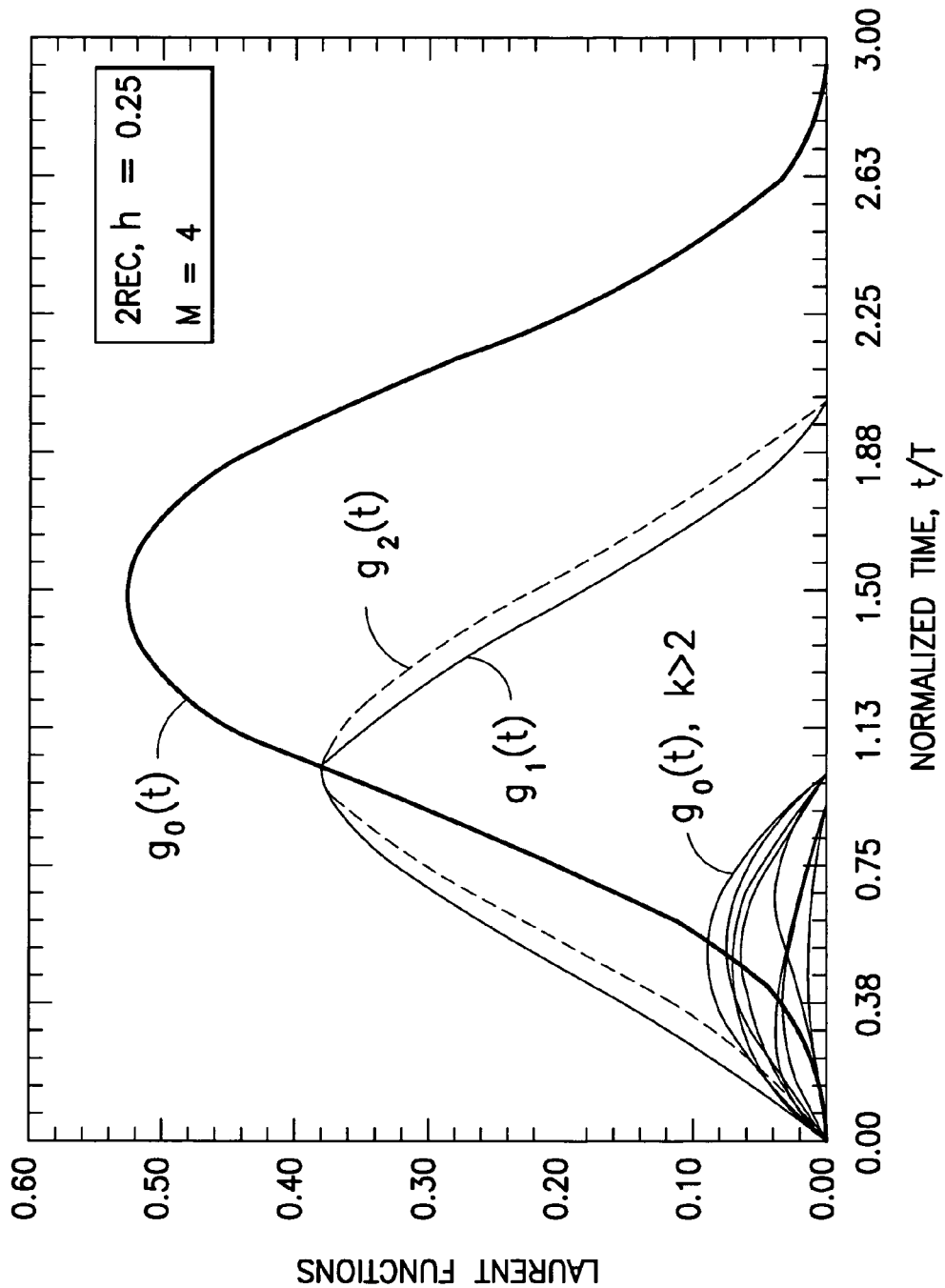
FIG. 13 is a graph of pulse energy for twelve pulses when a (non-binary) M-ary multi-h CPM signal is decomposed to PAM using a technique in the prior art.
Figure 14:
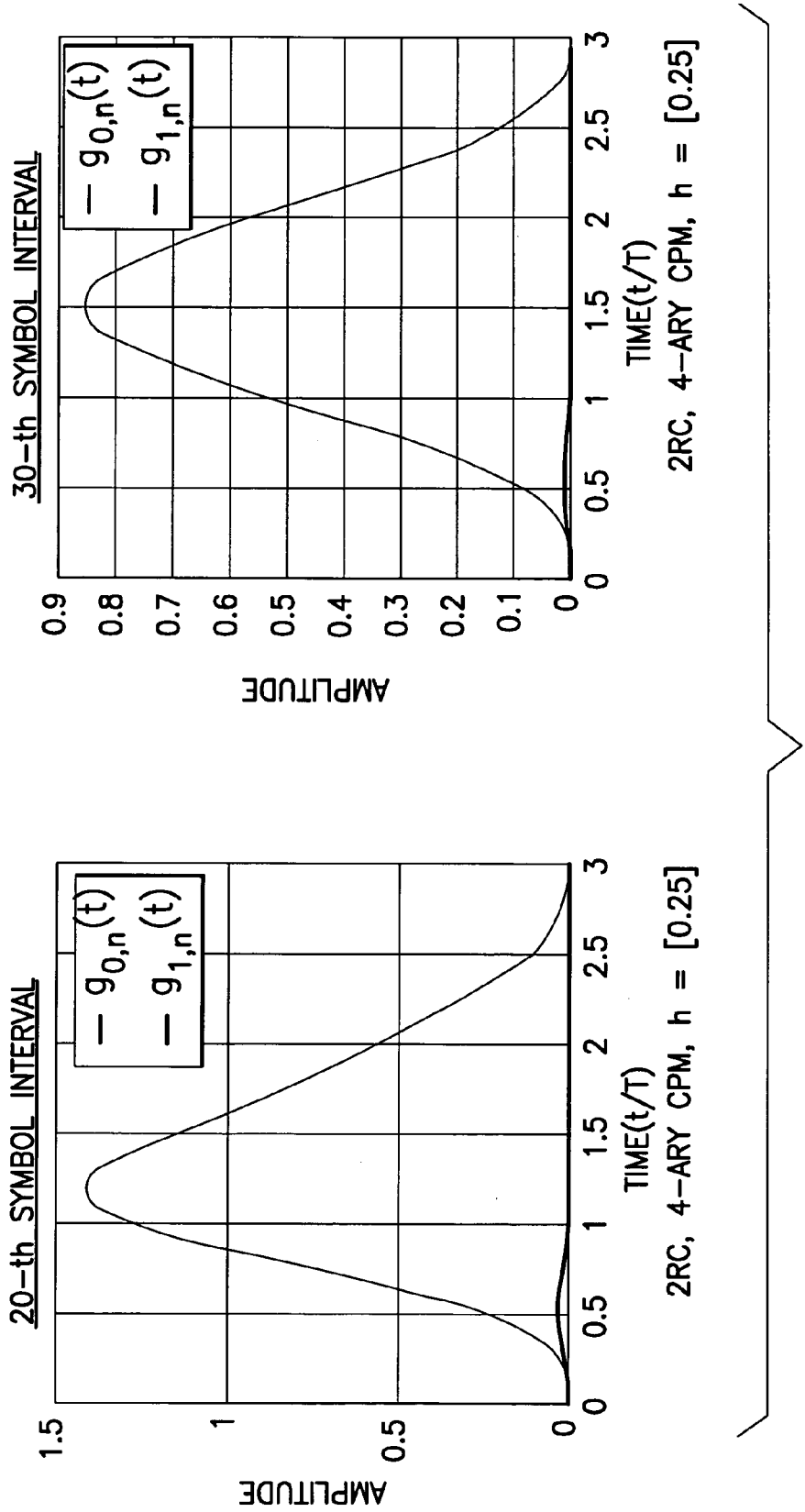
FIG. 14 is a two-part graph showing pulse energy in each of two different symbol intervals when the CPM signal of FIG. 13 is decomposed according to the present invention.

FIGS. 13 and 14 illustrate the difference in pulse energy between a decomposition according to the Mengali and Morelli approach, discussed above, and a decomposition according to an embodiment of the present invention. For each, the non-binary M-ary single-h CPM waveform sets M=4; h=¼; L=2; Q=2; raised cosine frequency pulse. Additionally for FIG. 13, $P=\log_2 M$. It is evident from FIG. 13 that the first three pulses $g_0(t)$; $g_1(t)$; and $g_2(t)$ have a similar energy distribution, and at least the second and third pulses are not distinctively ranked. None of these three pulses can be ignored if a PAM approximation of the CPM signal is to be accurate. In fact, the number of Laurent component pulses required to exactly represent the CPM signal in PAM over each symbol interval is $N=Q^P(2^P-1)=12$.

Contrast FIG. 13 to FIG. 14, which employs the present invention in the PAM decomposition. Each graph of FIG. 14 illustrates pulse energy in a different symbol interval. In each, a substantial portion of the symbol energy is concentrated in a single pulse, the first pulse $g_{0,n}(t)$. The second pulse $g_{1,n}(t)$ exhibits little energy and can reasonably be ignored without much loss of accuracy in a first order approximation. In fact, this embodiment of the present invention generates only those two pulses shown, so superimposing both leads to an exact PAM decomposition of the CPM signal. Two different symbol intervals are illustrated in FIG. 14 to show that the shape of the pulse might change in different symbol intervals, but the features of the present invention that are deemed important (energy concentration in a main pulse, distinctive pulse energy ranking, $Q=2^{L-1}$ total pulses) in order to make non-binary M-ary CPM practical are retained regardless of pulse shape variance across symbol intervals.

One important aspect of this invention is that it is the first extension of Laurent's Decomposition which allows any CPM waveform—whether binary single-h, M-ary single-h or M-ary multi-h—to be described as the sum of $Q=2^{L-1}$ PAM pulses over each symbol interval. The following observations are noteworthy:

- This invention can be used in order to synthesize "almost M-ary CPM" and "exact M-ary" CPM waveforms with reduced transmitter complexity vis-à-vis the previous solutions for M-ary CPM.
- This invention is general in its application to CPM and therefore represents a unification of results for binary, higher order and multi-h CPM waveforms.
- Implementation of this invention may reduce transmitter cost vis-à-vis the previously known solutions.

Specific embodiments of the present invention are now detailed. A mobile station MS is a handheld portable device that is capable of wirelessly accessing a communication network, such as a mobile telephony network of base stations that are coupled to a publicly switched telephone network. A cellular telephone, a Blackberry® device, and a personal digital assistant (PDA) with internet or other two-way communication capability are examples of a MS. A portable wireless device includes mobile stations as well as additional handheld devices such as walkie talkies and devices that may access only local networks such as a wireless localized area network (WLAN) or a WIFI network.

Figure 15:
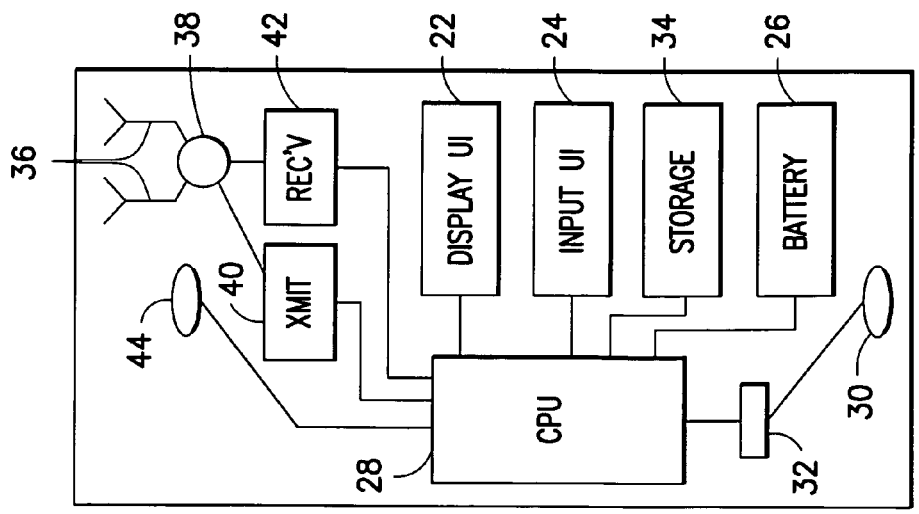
FIG. 15 is a block diagram of a mobile station in which the present invention may be embodied.

FIG. 15 illustrates in block diagram form a mobile station MS 20 in which the present invention may preferably be disposed. These blocks are functional and the functions described below may or may not be performed by a single physical entity as described with reference to FIG. 15. A display user interface 22, such as a circuit board for driving a visual display screen, and an input user interface 24, such as a unit for receiving inputs from an array of user actuated buttons, are provided for interfacing with a user. The MS 20 further includes a power source 26 such as a battery that provides portable electrical power to a central processor 28 that controls functions within the MS 20. Within the processor 28 are software and/or hardware controlling functions such as digital sampling, decimation, interpolation, encoding and decoding, modulating and demodulating, encrypting and decrypting, spreading and despreading (for a CDMA compatible MS 20), and additional signal processing functions known in the art.

Voice or other aural inputs are received at a microphone 30 that may be coupled to the processor 28 through a buffer memory 32. Computer programs such as drivers for the display 22, algorithms to modulate, encode and decode, data arrays such as look-up tables, and computer programs to decompose a CPM signal in accordance with the present invention are stored in a main memory storage media 34 which may be an electronic, optical, or magnetic memory storage media as is known in the art for storing computer readable instructions and programs and data. The main memory 34 is typically partitioned into volatile and non-volatile portions, and is commonly dispersed among different storage units, some of which may be removable such as a subscriber identity module (SIM). The MS 20 communicates over a network link such as a mobile telephony link via one or more antennas 36 that may be selectively coupled via a T/R switch 38, or a dipole filter, to a transmitter 40 and a receiver 42. The MS 20 may additionally have secondary transmitters and receivers for communicating over additional networks, such as a WLAN, WIFI, Bluetooth®, or to receive digital video broadcasts. Known antenna types include monopole, di-pole, planar inverted folded antenna PIFA, and others. The various antennas may be mounted primarily externally (e.g., whip) or completely internally of the MS 20 housing. Audible output from the MS 20 is transduced at a speaker 44. Most of the above-described components, and especially the processor 28, are disposed on a main wiring board, which typically includes a ground plane to which the antenna(s) 36 are electrically coupled.

In traditional CPM receivers, maximum likelihood estimation of the symbol based on Bayesian theory has been a dominant method for estimating an unknown parameter of the received signal in order to separate the symbols, whose transitions are somewhat obscured as compared to other waveforms. This results in a branch metric computation and generally either a Viterbi algorithm feedback or known symbols inserted into the data stream (e.g., in message headers or training sequences). Non-data aided approaches are also known, but generally less reliable. The present invention dispenses with the above computationally complex realizations because the receiver receives a PAM signal that mimics a CPM signal, and decomposes it as a PAM signal whose phase and timing uncertainties are more separable, and better resolved, than CPM. That the present invention does so in a manner that enables a high degree of accuracy using the energy of only one or two pulses (exact decomposition with $Q=2^{L-1}$ pulses) is a fundamental advantage over prior art PAM decompositions.

Figure 16:
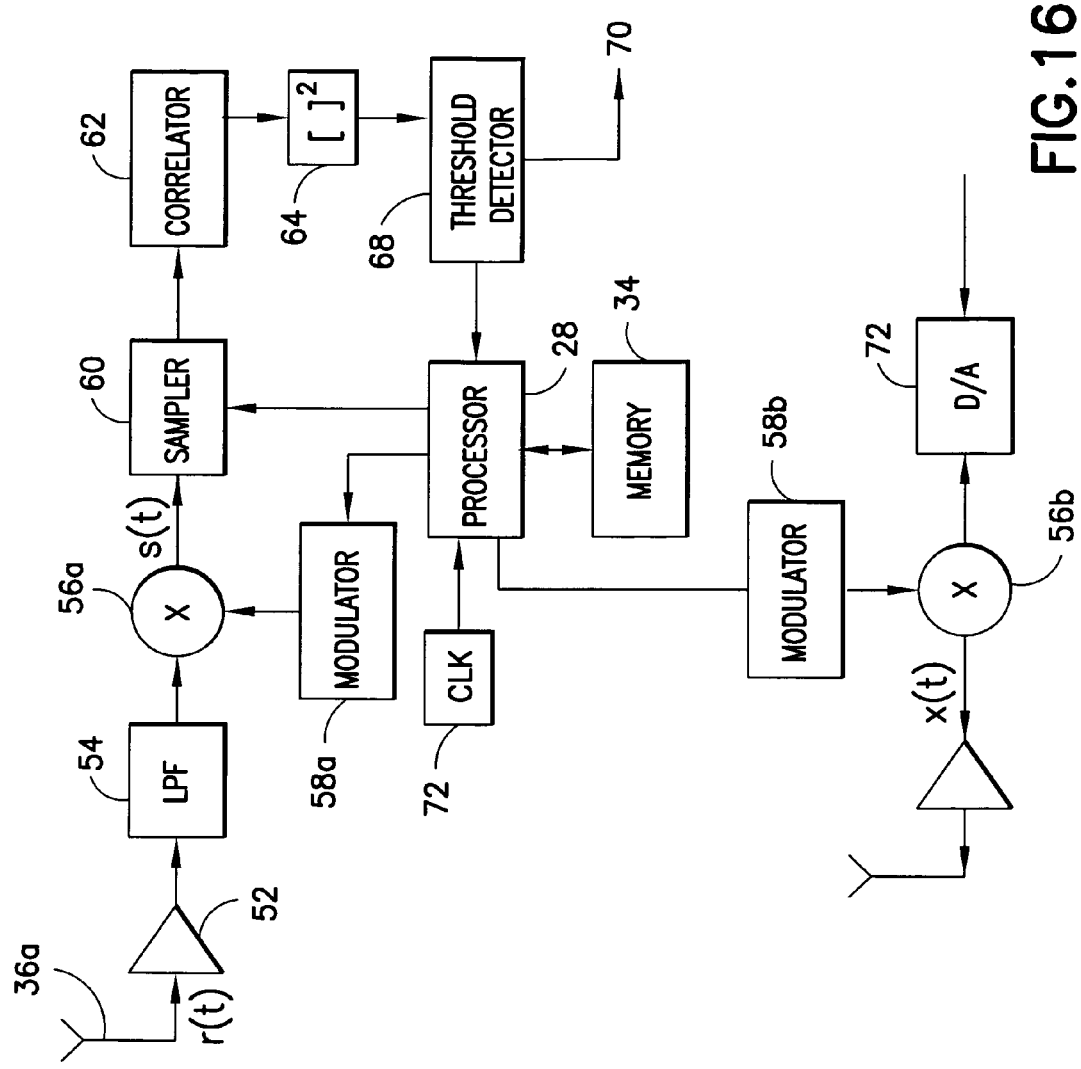
FIG. 16 is a schematic block diagram of a transceiver according to an embodiment of the present invention.

FIG. 16 is a schematic block diagram of a transceiver 50 according to one embodiment of the present invention, recognizing for completeness that in practice the received signal would be split after amplification and rotated into I and Q components that are processed in parallel, whereas FIG. 16 depicts only one serial path. A signal r(t), generated as x(t) at a transmitter according to equation [29], is received at one or more receive antennas 36a, amplified by an amplifier 52, and filtered at a low pass filter 54. The amplified and filtered signal is multiplied at a multiplier 56a by a modulated wave output from the modulator 58a. The modulator 58a decomposes the received signal r(t) into the PAM signal s(t) as detailed above, most generally at equation [26]. It is this PAM decomposed signal s(t) that is then sampled 60, de-scrambled (not shown) and correlated (if spread spectrum) to resolve an energy peak at a squarer 64 that minimizes instances of false alignment. When an energy peak of sufficient magnitude occurs, a threshold detector 68 closes a switch and enables the despread signal to pass toward further processing 70 such as decoding. The dotted line from the threshold detector 68 to the processor is a feedback link to inform the processor when alignment occurs so it can de-spread further signals more efficiently rather than test each possible alignment of slip values.

The processor synchronizes other components such as the sampler 60 with a local clock 72, and accesses various computer programs, data storage tables, and algorithms that are stored in the memory 34. Certain of these pertain to controlling the modulator to decompose the received signal r(t), which mirrors a CPM signal and which is input into the multiplier 56, as a PAM signal s(t) that is then detected and decoded. In accordance with equation [26], the computer program controlling the modulator causes the processor, for each $n^{th}$ symbol interval, to determine the product of a pseudo symbol $b_{k,n}$ and a function $g_{k,n}(t-nT)$, and to sum those products over $Q=2^L$ symbol intervals, where the function $g_{k,n}(t-nT)$ derives from a generalized phase function and where L is a number of symbol intervals over which a frequency function is defined. If the energy of more than one pulse is to be accumulated, then add the summed products for all k pulses between the 0 and Q−1 pulses.

Similar architecture is present at the transmitter, where some components such as the modulator are duplicated in transmit and receive side of the transceiver for clarity, though in practice one component may operate for both the transmit and receive modes. The desired information signal is converted to analog at a converter 72, and is modulated at the modulator 58*b* with the PAM decomposed waveform to result in the signal x(t) as in equation [29]. If the transmitter is configurable for different modulation indices and/or different M-ary signaling, the computer program at the memory 34 first determines single-h or multi-h and binary or non-binary M-ary signaling. The operable computer program then determines how many pulses are to be resolved at the receiver. As above, if transmitter complexity is a limiting factor, then set $Q_0=1$ so that there is only one value for the index k. For each $n^{th}$ symbol interval, determine a pseudo symbol $b_{k,n}$ and a function $g_{k,n}(t-nT)$, and sum those products over $Q_0$ symbol intervals, where the function $g_{k,n}(t-nT)$ derives from a generalized phase function and where L is a number of symbol intervals over which a frequency function is defined. If the energy of more than one pulse is to be accumulated, then add the summed products for all k pulses between the 0 and Q−1 pulses. Modulate the signal as above and transmit. The PAM modulated signal x(t) is then amplified 52*b* and transmitted by one or more transmit antennas 36*b*.

The various functions and parameters may be stored in the memory as a lookup table, as algorithms, or a combination of both embodied as hardware, software, or both, and readable/executable by a digital processor.

Embodiments of the present invention preserve certain advantages of the Laurent Decomposition in non-binary M-ary and multi-h modulations as follows:

The PAM component pulses in the decomposition are distinctively ordered, so that the first component pulse contributes the most significant energy to the waveform and the last component pulse is negligible—just as in the binary CPM case.

Over each symbol interval, there is clearly one "main pulse" that may be used to synthesize (or evaluate) the M-ary CPM waveform with a high degree of accuracy—just as in the binary CPM case.

Over each symbol interval, the total number of PAM component pulses is equal to $Q=2^{L-1}$—just as in the binary CPM case.

It is possible to generate an "almost M-ary CPM" or "exact M-ary CPM" waveform using a minimal number of PAM component pulses (when compared to the prior art)—just as in the binary CPM case.

As detailed above, the present invention solves the complexity problem in expressing an M-ary CPM waveform as the superposition of PAM waveforms. In addition, this invention also results in the following advantages:

A reduction in transmitter complexity (and possibly cost) for the synthesis of "almost M-ary CPM" waveforms;

A reduction in the level of difficulty required to evaluate the performance or characteristics of M-ary CPM waveforms;

A reduction in receiver complexity (and possibly cost) for the reception of "almost M-ary CPM" or "exact M-ary CPM" waveforms.

As a review, the present invention embodies a new decomposition that generalizes Laurent's work on binary CPM to M-ary single-h, binary multi-h and M-ary multi-h CPM waveforms. Importantly, it retains many of the useful properties of the Laurent Decomposition for binary single-h CPM. The significance of this invention is that one can use this new PAM decomposition in order to define an optimized "almost M-ary CPM" waveform that constructs the desired signal using the smallest number of component PAM terms in the decomposition for a certain metric of performance (such as an upper bound on the Peak-to-Average-Power-Ratio) (when compared to the prior art).

Specifically, the present invention poses an alternate, exact and concise formulation of M-ary single-h and multi-h CPM waveforms as the sum of a finite number PAM signals. This formulation facilitates the synthesis of "almost M-ary CPM" or "exact M-ary CPM" signals with reduced transmitter complexity. The present invention may be used to linearize GMSK waveforms and design simpler receivers, for example by using it to develop simplified techniques for correlating the received signal against a training portion of a burst. The greatest savings over prior art is seen to be in higher order CPM waveforms.

Further, since the present invention embodies a mechanism that simplifies the PAM representation/approximation of higher order CPM waveforms, it overcomes one of the critical shortfalls that has caused CPM to lag behind OFDM for utilization in high capacity wireless communications. Specifically, one of the major drawbacks of OFDM is the occurrence of large envelope fluctuations, which makes linear amplification extremely challenging. The dynamic range of the complex envelope of an OFDM signal can drive a power amplifier to exhibit nonlinear characteristics and lower power efficiency as the signal input power approaches the saturation region. In contrast to OFDM, CPM schemes are efficient in both power and bandwidth, but have not been widely considered as viable due to the nonlinearity of higher-order CPM signals, resulting in high implementation complexity and difficulty of use with certain receiver architectures. The present invention is seen to resolve that complexity/non-linearity problem for higher-order CPM.

Although described in the context of particular embodiments, it will be apparent to those skilled in the art that a number of modifications and various changes to these teachings may occur. Thus, while the invention has been particularly shown and described with respect to one or more preferred embodiments thereof, it will be understood by those skilled in the art that certain modifications or changes may be made therein without departing from the scope and spirit of the invention as set forth above, or from the scope of the ensuing claims.

What is claimed is:

1. An apparatus comprising:
  a signal source;
  a modulator configured to output a M-ary pulse-amplitude modulated waveform that is a superposition of $Q_0 \leq 2^{L-1}$ pulse-amplitude modulated component pulses in each symbol interval, where M>2 is a number of allowed discrete amplitude values and L represents a number of symbol intervals;
  a multiplier having inputs from the signal source and the modulator; and
  a processor configured to drive the modulator to shape the $Q_0$ pulse-amplitude modulated component pulses in each symbol interval such that at least a significant portion of signal energy for each symbol interval of a transmission burst is carried in that symbol interval's $Q_0$ pulse-amplitude modulated component pulses.

2. The apparatus of claim 1, wherein $Q_0=1$ and at least a significant portion of signal energy in the one pulse-amplitude modulated component pulse comprises at least 95% of signal energy.

3. The apparatus of claim 1, wherein $Q_0=2^{L-1}$ and at least a significant portion of signal energy comprises all signal energy.

4. The apparatus of claim 3, wherein the multiplier operates to multiply the input from the signal source by a truncated input from the modulator, the truncated input characterized by less than all $Q_0=2^{L-1}$ pulse-amplitude modulated component pulses for each symbol interval.

5. The apparatus of claim 1, wherein the output of the multiplier is represented by:

$$x(t, a, h) = \sum_{k=0}^{Q_0-1} \sum_n b_{k,n} g_{k,n}(t - nT),$$

$$1 \leq Q_0 \leq Q;$$

$$(Q = 2^{L-1});$$

where $b_{k,n}$ represents a pseudo symbol, $g_{k,n}(t-nT)$ represents a function that derives from a phase function of the signal, and T is symbol duration.

6. An apparatus comprising:
a signal source;
a modulator configured to output a binary, multi-h pulse-amplitude modulated waveform that is a superposition of $Q_0 \leq 2^{L-1}$ pulse-amplitude modulated component pulses in each symbol interval, h>1 is a number of modulating indices, and L represents a number of symbol intervals;
a multiplier having inputs from the signal source and the modulator; and
a processor configured to drive the modulator to shape the $Q_0$ pulse-amplitude modulated component pulses in each symbol interval such that at least a significant portion of signal energy for each symbol interval of a transmission burst is carried in that symbol interval's $Q_0$ pulse-amplitude modulated component pulses.

7. The apparatus of claim 6, wherein $Q_0=1$ and at least a significant portion of signal energy in the one pulse-amplitude modulated component pulse comprises at least 95% of signal energy.

8. The apparatus of claim 6, wherein $Q_0=2^{L-1}$ and at least a significant portion of signal energy comprises all signal energy.

9. The apparatus of claim 8, wherein the multiplier operates to multiply the input from the signal source by a truncated input from the modulator, the truncated input characterized by less than all $Q_0=2^{L-1}$ pulse-amplitude modulated component pulses for each symbol interval.

10. The apparatus of claim 6, wherein the output of the multiplier is represented by:

$$x(t, a, h) = \sum_{k=0}^{Q_0-1} \sum_n b_{k,n} g_{k,n}(t - nT),$$

$$1 \leq Q_0 \leq Q;$$

$$(Q = 2^{L-1});$$

where $b_{k,n}$ represents a pseudo symbol, $g_{k,n}(t-nT)$ represents a function that derives from a phase function of the signal, and T is symbol duration.

11. A memory embodying a program of machine-readable instructions, executable by a digital data processor, to perform actions directed toward modulating an input signal, the actions comprising:
determining a M-ary pulse-amplitude modulated waveform that is a superposition of $Q_0 \leq 2^{L-1}$ pulse-amplitude modulated component pulses in each symbol interval such that at least a significant portion of signal energy over each symbol interval of a burst is within the $Q_0$ pulse-amplitude modulated component pulses;
combining the M-ary pulse-amplitude modulated waveform with a signal to be transmitted; and
transmitting the modulated signal,
where M>2 is a number of allowed discrete amplitude values and L represents a number of symbol intervals.

12. The memory of claim 11, wherein $Q_0=1$ and at least a significant portion of signal energy in the one pulse-amplitude modulated component pulse comprises at least 95% of signal energy.

13. The memory of claim 11, wherein $Q_0=2^{L-}$ and at least a significant portion of signal energy comprises all signal energy.

14. The memory of claim 11, wherein determining the M-ary pulse-amplitude modulated waveform comprises:
for each $n^{th}$ symbol of duration T, determining a product of a pseudo symbol $b_{k,n}$ and a function $g_{k,n}(t-nT)$ that derives from a phase function of the signal, and summing the products over $Q_0$ pulse-amplitude modulated component pulses.

15. The memory of claim 14, wherein determining further comprises adding the sums of the products over all symbol intervals for all component pulses.

16. The memory of claim 11, wherein determining the M-ary pulse-amplitude modulated waveform that is a superposition of $Q_0 \leq 2^{L-1}$ pulse-amplitude modulated component pulses comprises
determining a M-ary pulse-amplitude modulated waveform that is a superposition of $Q_0=2^{L-1}$ pulse-amplitude modulated component pulses in each symbol interval such that all signal energy over each symbol interval of a burst is within the $Q_0$ pulse-amplitude modulated component pulses, and
truncating to $Q_0<2^{L-1}$ pulse-amplitude modulated component pulses.

17. A memory embodying a program of machine-readable instructions, executable by a digital data processor, to perform actions directed toward modulating an input signal, the actions comprising:
determining a binary multi-h pulse-amplitude modulated waveform that is a superposition of $Q_0 \leq 2^{L-1}$ pulse-amplitude modulated component pulses in each symbol interval such that at least a significant portion of signal energy over each symbol interval of a burst is within the $Q_0$ pulse-amplitude modulated component pulses;
combining the binary pulse-amplitude modulated waveform with a signal to be transmitted; and
transmitting the modulated signal,
where h>1 is a number of modulating indices, and L represents a number of symbol intervals.

18. The memory of claim 17, wherein $Q_0<2^{L-1}$ and at least a significant portion of signal energy in the one pulse-amplitude modulated component pulse comprises at least 95% of signal energy.

19. The memory of claim 17, wherein $Q_0=2^{L-1}$ and at least a significant portion of signal energy comprises all signal energy.

20. The memory of claim 17, wherein determining the binary multi-h pulse-amplitude modulated waveform comprises:
for each $n^{th}$ symbol of duration T, determining a product of a pseudo symbol $b_{k,n}$ and a function $g_{k,n}(t-nT)$ that derives from a phase function of the signal, and summing the products over $Q_0$ pulse-amplitude modulated component pulses.

21. The memory of claim 20, wherein determining further comprises adding the sums of the products over all symbol intervals for all component pulses.

22. The memory of claim 17, wherein determining the binary multi-h pulse-amplitude modulated waveform that is a superposition of $Q_0 \leq 2^{L-1}$ pulse-amplitude modulated component pulses comprises
determining a binary multi-h pulse-amplitude modulated waveform that is a superposition of $Q_0=2^{L-1}$ pulse-amplitude modulated component pulses in each symbol interval such that all signal energy over each symbol interval of a burst is within the $Q_0$ pulse-amplitude modulated component pulses, and
truncating to $Q_0 < 2^{L-1}$ pulse-amplitude modulated component pulses.

23. An apparatus comprising:
signal source means; and
modulating means for determining, for each symbol interval of a burst in which symbols are modulated over M>2 discrete amplitudes, a plurality of $Q_0$ pulses that are shaped such that the pulses are ordered by an amount of signal energy they carry, the modulator means further for superimposing the plurality of $Q_0$ pulses into a combined waveform with continuous phase that modulates an output of the signal means for transmission;
wherein the modulating means comprises a processor, a memory, a modulator, and a multiplier coupled together.

24. An apparatus comprising:
signal source means;
modulating means for determining, for each symbol interval of a burst in which symbols are modulated over two discrete amplitudes, a plurality of $Q_0$ pulses modulated with h>1 modulating indices that are shaped such that the pulses are ordered by an amount of signal energy they carry, the modulator means further for superimposing the plurality of $Q_0$ pulses into a combined waveform with continuous phase that modulates an output of the signal means; and
transmitting means for transmitting the signal modulated on the combined waveform; wherein the modulating means comprises a processor, a memory, a modulator, and a multiplier coupled together.

25. A method comprising:
constructing a function $g_{k,n}(t)$ with a processor of an electronic device to construct a signal x(t, a, h);
the processor shifting the function by nT;
the processor multiplying the shifted function by a pseudo symbol $b_{k,n}$;
the processor summing over $Q_0$ pulses the multiplied and shifted function; and
the processor summing over n symbols the $Q_0$ pulses;
wherein t is a time index, $a=\{a_i\}$ represents a phase of a complex data symbol, h is a modulating index, and T is symbol duration.

26. A method comprising:
determining with a digital processor of an apparatus a M-ary pulse-amplitude modulated waveform that is a superposition of $Q_0=1$ pulse-amplitude modulated component pulses in each symbol interval such that at least 95% of signal energy over each symbol interval of a burst is within the $Q_0$ pulse-amplitude modulated component pulse;
the digital processor combining the M-ary pulse-amplitude modulated waveform with a signal to be transmitted; and
transmitting the modulated signal from a transmitter of the apparatus,
where M>2 is a number of allowed discrete amplitude values.

27. A method comprising:
determining with a digital processor of an apparatus a M-ary pulse-amplitude modulated waveform that is a superposition of $Q_0 \leq 2^{L-1}$ pulse-amplitude modulated component pulses in each symbol interval such that at least a significant portion of signal energy of signal energy over each symbol interval of a burst is within the $Q_0$ pulse-amplitude modulated component pulses;
the digital processor combining the M-ary pulse-amplitude modulated waveform with a signal to be transmitted; and
transmitting the modulated signal from a transmitter of the apparatus,
where M>2 is a number of allowed discrete amplitude values and L represents a number of symbol intervals;
wherein determining with the digital processor of the apparatus the M-ary pulse-amplitude modulated waveform comprises:
for each $n^{th}$ symbol of duration T, determining with the digital processor a product of a pseudo symbol $b_{k,n}$ and a function $g_{k,n}(t-nT)$ that derives from a phase function of the signal, and the digital processor summing the products over $Q_0$ pulse-amplitude modulated component pulses.

28. The method of claim 27, wherein determining with the digital processor of the apparatus the M-ary pulse-amplitude modulated waveform further comprises the digital processor adding the sums of the products over all symbol intervals for all component pulses.

29. A method comprising:
determining with a digital processor of an apparatus a M-ary pulse-amplitude modulated waveform that is a superposition of $Q_0 \leq 2^{L-1}$ pulse-amplitude modulated component pulses in each symbol interval such that at least a significant portion of signal energy of signal energy over each symbol interval of a burst is within the $Q_0$ pulse-amplitude modulated component pulses;
the digital processor combining the M-ary pulse-amplitude modulated waveform with a signal to be transmitted; and
transmitting the modulated signal from a transmitter of the apparatus,
where M>2 is a number of allowed discrete amplitude values and L represents a number of symbol intervals;
wherein determining with the digital processor of the apparatus the M-ary pulse-amplitude modulated waveform that is a superposition of $Q_0 \leq 2^{L-1}$ pulse-amplitude modulated component pulses comprises:
determining with the digital processor a M-ary pulse-amplitude modulated waveform that is a superposition of $Q_0=2^{L-1}$ pulse-amplitude modulated component pulses in each symbol interval such that all signal energy over each symbol interval of a burst is within the $Q_0$ pulse-amplitude modulated component pulses, and
the digital processor truncating to $Q_0 < 2^{L-1}$ pulse-amplitude modulated component pulses.

30. A method comprising: determining with a digital processor of an apparatus a binary multi-h pulse-amplitude modulated waveform that is a superposition of $Q_0 < 2^{L-1}$ pulse-amplitude modulated component pulses in each symbol interval such that at least 95% of signal energy over each symbol interval of a burst is within the $Q_0$ pulse-amplitude modulated component pulses;

the digital processor combining the binary pulse-amplitude modulated waveform with a signal to be transmitted; and transmitting the modulated signal from a transmitter of the apparatus, where h>1 is a number of modulating indices, and L represents a number of symbol intervals.

31. A method comprising:

determining with a digital processor of an apparatus a binary multi-h pulse-amplitude modulated waveform that is a superposition of $Q_0 \leq 2^{L-1}$ pulse-amplitude modulated component pulses in each symbol interval such that at least a significant portion of signal energy over each symbol interval of a burst is within the $Q_0$ pulse-amplitude modulated component pulses;

the digital processor combining the binary pulse-amplitude modulated waveform with a signal to be transmitted; and transmitting the modulated signal from a transmitter of the apparatus, where h>1 is a number of modulating indices, and L represents a number of symbol intervals;

and wherein determining with the digital processor the binary multi-h pulse-amplitude modulated waveform comprises:

for each $n^{th}$ symbol of duration T, determining with the digital processor a product of a pseudo symbol $b_{k,n}$ and a function $g_{k,n}(t-nT)$ that derives from a phase function of the signal, and the digital processor summing the products over $Q_0$ pulse-amplitude modulated component pulses.

32. The method of claim 31, wherein determining further comprises the digital processor adding the sums of the products over all symbol intervals for all component pulses.

33. A method comprising:

determining with a digital processor of an apparatus a binary multi-h pulse-amplitude modulated waveform that is a superposition of $Q_0 \leq 2^{L-1}$ pulse-amplitude modulated component pulses in each symbol interval such that at least a significant portion of signal energy over each symbol interval of a burst is within the $Q_0$ pulse-amplitude modulated component pulses;

the digital processor combining the binary pulse-amplitude modulated waveform with a signal to be transmitted; and transmitting the modulated signal from a transmitter of the apparatus, where h>1 is a number of modulating indices, and L represents a number of symbol intervals;

and wherein determining with the digital processor the binary multi-h pulse-amplitude modulated waveform that is a superposition of $Q_0 \leq 2^{L-1}$ pulse-amplitude modulated component pulses comprises:

determining with the digital processor a binary multi-h pulse-amplitude modulated waveform that is a superposition $Q_0 = 2^{L-1}$ pulse-amplitude modulated component pulses in each symbol interval such that all signal energy over each symbol interval of a burst is within the $Q_0$ pulse-amplitude modulated component pulses, and the digital processor truncating to $Q_0 < 2^{L-1}$ pulse-amplitude modulated component pulses.

* * * * *

UNITED STATES PATENT AND TRADEMARK OFFICE
CERTIFICATE OF CORRECTION

PATENT NO. : 7,684,497 B2
APPLICATION NO. : 11/174263
DATED : March 23, 2010
INVENTOR(S) : Green It is certified that error appears in the above-identified patent and that said Letters Patent is hereby corrected as shown below:

Claim 13, col. 18, line 23 delete "$Q_0=2^{L-}$" and insert -- $Q_0=2^{L-1}$ --.

Signed and Sealed this

Eighteenth Day of May, 2010

David J. Kappos
*Director of the United States Patent and Trademark Office*